(12) United States Patent
Peng et al.

(10) Patent No.: US 11,579,434 B1
(45) Date of Patent: Feb. 14, 2023

(54) REFLECTIVE EYEPIECE OPTICAL SYSTEM AND HEAD-MOUNTED NEAR-TO-EYE DISPLAY DEVICE

(71) Applicant: Shenzhen NED Optics Co., Ltd, Shenzhen (CN)

(72) Inventors: Huajun Peng, Shenzhen (CN); Hongpeng Cao, Shenzhen (CN); Jianfei Guo, Shenzhen (CN)

(73) Assignee: Shenzhen NED Optics Co., Ltd, Shenzhen (CN)

( * ) Notice: Subject to any disclaimer, the term of this patent is extended or adjusted under 35 U.S.C. 154(b) by 0 days.

(21) Appl. No.: 17/879,431

(22) Filed: Aug. 2, 2022

(30) Foreign Application Priority Data

Aug. 2, 2021 (CN) .......................... 202110879523.8

(51) Int. Cl.
*G02B 25/00* (2006.01)
*G02B 9/62* (2006.01)
*G02B 27/01* (2006.01)

(52) U.S. Cl.
CPC ............. *G02B 25/001* (2013.01); *G02B 9/62* (2013.01); *G02B 27/0172* (2013.01)

(58) Field of Classification Search
CPC .... G02B 25/001; G02B 9/62; G02B 27/0172; G02B 17/0856
See application file for complete search history.

(56) References Cited

FOREIGN PATENT DOCUMENTS

JP H07159719 A * 6/1995

OTHER PUBLICATIONS

JP-H07159719-A, translation (Year: 1995).*

* cited by examiner

*Primary Examiner* — Wen Huang
(74) *Attorney, Agent, or Firm* — Nitin Kaushik

(57) ABSTRACT

The present invention relates to a reflective eyepiece optical system and a head-mounted near-to-eye display apparatus. The system includes: a first lens group, and a first optical element and a second lens group for transmitting and reflecting a light from a miniature image displayer. The second lens group includes an optical reflection surface, and the optical reflection surface is an optical surface farthest from a human eye viewing side in the second lens group. The optical reflection surface is concave to a human eye viewing direction. The first optical element reflects the light refracted by the first lens group to the second lens group, and then transmits the light refracted, reflected, and refracted by the second lens group to the human eyes.

20 Claims, 25 Drawing Sheets

REFLECTIVE EYEPIECE OPTICAL SYSTEM AND HEAD-MOUNTED NEAR-TO-EYE DISPLAY DEVICE

CROSS-REFERENCE TO RELATED APPLICATIONS

The application claims priority to Chinese patent application No. 202110879523.8, filed on Aug. 2, 2021, the entire contents of which are incorporated herein by reference.

TECHNICAL FIELD

The present invention relates to the field of optical technology, and more particularly, to a reflective eyepiece optical system and a head-mounted near-to-eye display device.

BACKGROUND

With the development of electronic devices to ultra-miniaturization, head-mounted display devices and products are constantly emerging in military, industrial, medical, educational, consumption and other fields, and in a typical wearable computing architecture, a head-mounted display device is a key component. The head-mounted display device directs the video image light emitted from a miniature image displayer (e.g., a transmissive or reflective liquid crystal displayer, an organic electroluminescent element, or a DMD device) to the pupil of a user by optical technology to implement virtual magnified images in the near-eye range of the user, so as to provide the user with intuitive and visual images, video, and text information. The eyepiece optical system is the core of the head-mounted display device, which realizes the function of displaying a miniature image in front of human eyes to form a virtual magnified image.

The head-mounted display device develops in the direction of compact size, light weight, convenient wearing, and load reduction. Meanwhile, a large field-of-view angle and visual comfort experience have gradually become key factors to evaluate the quality of the head-mounted display device. The large field-of-view angle determines a visual experience effect of high liveness, and high image quality and low distortion determine the comfort of visual experience. To meet these requirements, the eyepiece optical system should try its best to achieve such indexes as a large field-of-view angle, high image resolution, low distortion, small field curvature, and a small volume. It is a great challenge for system design and aberrations optimization to meet the above optical properties at the same time.

In Patent Document 1 (Chinese Patent Publication No. CN101915992A), Patent Document 2 (Chinese Patent Publication No. CN211698430U), Patent Document 3 (Chinese Patent Publication No. CN106662678A), and Patent Document 4 (Chinese Patent Publication No. CN105229514A), a reflective optical system utilizing a combination of conventional optical spherical surfaces and even-order aspherical surfaces is provided respectively, wherein Patent Document 1 adopts a relay scheme, but this scheme adopts a free-form surface reflection means, which greatly increases the difficulty of realizing the entire optical system; the optical systems in the Patent Document 2, Patent Document 3, and Patent Document 4 use reflective optical systems, but the basic optical structures vary greatly from one to another due to different application fields, such as in terms of a matching relationship between a lens face shape and a gap between the lenses.

Patent Document 5 (Chinese Patent Publication No. CN207081891U) and Patent Document 6 (Chinese Patent Publication No. CN108604007A) provide an eyepiece optical system that adopts a reflex means, which ensures high-quality imaging; however, its optical structure is often limited to single lens reflection, thereby greatly limiting a performance ratio of the entire optical structure.

To sum up, the existing optical structures not only have problems such as heavyweight, small field-of-view angle, and insufficient optical performance, but also have problems such as difficulty in processing and mass production due to the difficulty of implementation.

SUMMARY

The technical problem to be solved by the present invention is that the existing optical structure has the problems of heavy weight, low image quality, distortion, insufficient field-of-view, and difficulty in mass production. In order to solve the above defects in the related art, a reflective eyepiece optical system and a head-mounted near-to-eye display device are provided.

A technical solution adopted by the present invention to solve the technical problem is constructing a reflective eyepiece optical system, including a first lens group, and a first optical element and a second lens group for transmitting and reflecting a light from a miniature image displayer; wherein the second lens group includes an optical reflection surface, and the optical reflection surface is an optical surface farthest from a human eye viewing side in the second lens group; the optical reflection surface is concave to a human eye viewing direction; the first optical element reflects the light refracted by the first lens group to the second lens group, and then transmits the light refracted, reflected, and refracted by the second lens group to the human eyes;

an effective focal length of the eyepiece optical system is $f_w$, an effective focal length of the first lens group is $f_1$, an effective focal length of the second lens group is $f_2$, and $f_w$, $f_1$, $f_2$ satisfy the following relations (1) and (2):

$$f_1/f_w < -0.47 \tag{1}$$

$$-2.53 < f_2/f_w < -0.64 \tag{2}$$

the first lens group includes a first sub-lens group, a second sub-lens group, and a third sub-lens group arranged coaxially and successively along an optical axis from the human eye viewing side to the miniature image displayer side; effective focal lengths of the first sub-lens group, the second sub-lens group, and the third sub-lens group are a combination of positive, negative, and positive; the effective focal length of the first sub-lens group is $f_{11}$, the effective focal length of the second sub-lens group is $f_{12}$, the effective focal length of the third sub-lens group is $f_{13}$, and $f_{11}$, $f_{12}$, $f_{13}$, and $f_1$ satisfy the following relations (3), (4), and (5):

$$0.19 < f_{11}/f_1 \tag{3}$$

$$f_{12}/f_1 < -0.019 \tag{4}$$

$$0.019 < f_{13}/f_1 \tag{5}$$

Further, a distance along the optical axis between the first optical element and the second lens group is $d_1$, a distance along the optical axis between the first optical element and the first lens group is $d_2$, and $d_1$ and $d_2$ satisfy the following relation (6):

$$0.69 < d_2/d_1 \tag{6}$$

Further, a maximum effective optical aperture of the second lens group is $\varphi_2$, and $\varphi_2$ satisfies the following relation (7):

$$\varphi_2 < 70 \text{ mm} \quad (7).$$

Further, the first sub-lens group is composed of one lens, wherein the first sub-lens group includes a first lens, and the first lens is a positive lens.

Further, the first sub-lens group is composed of two lenses; wherein the first sub-lens group includes a first lens and a second lens arranged coaxially and successively along the optical axis from the human eye viewing side to the miniature image displayer side; and the first lens and the second lens are both positive lenses.

Further, an effective focal length of the first lens is $f_{111}$, the effective focal length of the first sub-lens group is $f_{11}$, and $f_{111}$ and $f_{11}$ satisfy the following relation (8):

$$0.10 < |f_{111}/f_{11}| \quad (8).$$

Further, an optical surface of the first lens proximate to the human eye viewing side is convex to the human eyes.

Further, the second sub-lens group includes a third lens adjacent to the first sub-lens group; the third lens is a negative lens; an optical surface of the third lens proximate to the miniature image displayer side is concave to the miniature image displayer; and an effective focal length of the third lens is $f_{121}$, and $f_{121}$ satisfies the following relation (9):

$$f_{121} < -5.38 \quad (9).$$

Further, the third sub-lens group includes a fourth lens adjacent to the second sub-lens group; the fourth lens is a positive lens; and an effective focal length of the fourth lens is $f_{131}$, and $f_{131}$ satisfies the following relation (10):

$$8.82 < f_{131} \quad (10).$$

Further, the effective focal length $f_{11}$ of the first sub-lens group, the effective focal length $f_{12}$ of the second sub-lens group, the effective focal length $f_{13}$ of the third sub-lens group, and the effective focal length $f_1$ of the first lens group further satisfy the following relations (11), (12), and (13):

$$0.73 < f_{11}/f_1 < 0.83 \quad (11);$$

$$-3.38 < f_{12}/f_1 < -1.90 \quad (12);$$

$$1.32 < f_{13}/f_1 < 1.83 \quad (13).$$

Further, the second lens group includes a fifth lens adjacent to the first optical element; and the optical reflection surface is located on an optical surface of the fifth lens distant from the human eyes.

Further, the second lens group includes a fifth lens and a sixth lens adjacent to the first optical element; the fifth lens and the sixth lens are arranged successively in an incident direction of an optical axis of the human eyes; and the optical reflection surface is located on an optical surface of the fifth lens distant from the human eyes.

Further, an effective focal length of the optical reflection surface is $f_{S2}$, the effective focal length of the second lens group is $f_2$, and $f_2$ and $f_{S2}$ satisfy the following relation (14):

$$0.46 \leq f_{S2}/f_2 \leq 1.0 \quad (14).$$

Further, the first optical element is a planar transflective optical element, a reflectivity of the first optical element is $Re_1$, and $Re_1$ satisfies the following relation (15):

$$20\% < Re_1 < 80\% \quad (15).$$

Further, a reflectivity of the optical reflection surface is $Re_2$, and $Re_2$ satisfies the following relation (16):

$$20\% < Re_2 \quad (16).$$

Further, an angle of optical axis between the first lens group and the second lens group is $\lambda_1$, and $\lambda_1$ satisfies the following relation (17):

$$55° < \lambda_1 < 120° \quad (17).$$

Further, the eyepiece optical system further includes a planar reflective optical element located between the first lens group and the first optical element; the planar reflective optical element reflects the light refracted by the first lens group to the first optical element, the first optical element reflects the light to the second lens group, and then transmits the light refracted, reflected, and refracted by the second lens group to the human eyes;

an included angle between the first lens group and the first optical element is $\lambda_2$, and $\lambda_2$ satisfies the following relation (18):

$$60° \leq \lambda_2 \leq 180° \quad (18).$$

Further, the first lens group includes one or more even-order aspherical face shapes; and the optical reflection surface is an even-order aspherical face shape.

Further, the even-order aspherical face shape satisfies the following relation (19):

$$z = \frac{cr^2}{1 + \sqrt{1 - (1+k)c^2 r^2}} + \alpha_2 r^2 + \alpha_4 r^4 + \alpha_6 r^6 + \ldots \quad (19)$$

Further, the material of various lenses in the second lens group is an optical plastic material.

The present application provides a head-mounted near-to-eye display device, including a miniature image displayer, and further including the reflective eyepiece optical system according to any one of above items, wherein the eyepiece optical system is located between the human eyes and the miniature image displayer.

Further, the miniature image displayer is an organic electroluminescence device.

Further, the head-mounted near-to-eye display device includes two identical reflective eyepiece optical systems.

The present invention has following beneficial effects: the first optical element and the second lens group have transmission and reflection properties, and the second lens group includes a reflection surface. The eyepiece optical system composed of the first lens group, the second lens group, and the first optical element is used for effectively folding an optical path, which reduces the overall size of the eyepiece optical system and improves the possibility of subsequent mass production. The first lens group includes a first sub-lens group, a second sub-lens group, and a third sub-lens group. The first sub-lens group, the second sub-lens group, and the third sub-lens group adopt a combination of positive, negative, and positive. On the basis of miniaturization, cost and weight reduction for the article, the aberrations of the optical system are greatly eliminated, and the basic optical indicators are also improved, ensuring high image quality and increasing the size of the picture angle. Therefore, an observer can watch large images of full frame, high definition and uniform image quality without any distortion and get visual experience of high liveness via the present invention, which is suitable for near-to-eye displays and similar devices thereof.

BRIEF DESCRIPTION OF THE DRAWINGS

In order to illustrate technical solutions of embodiments of the present invention or the prior art more clearly, the present invention will be further illustrated below with reference to accompanying drawings and embodiments. The accompanying drawings described below are merely some embodiments of the present invention, and for those of ordinary skill in the art, other accompanying drawings can be obtained according to these accompanying drawings without creative effort.

DETAILED DESCRIPTION OF THE PREFERRED EMBODIMENT

Figure 1:
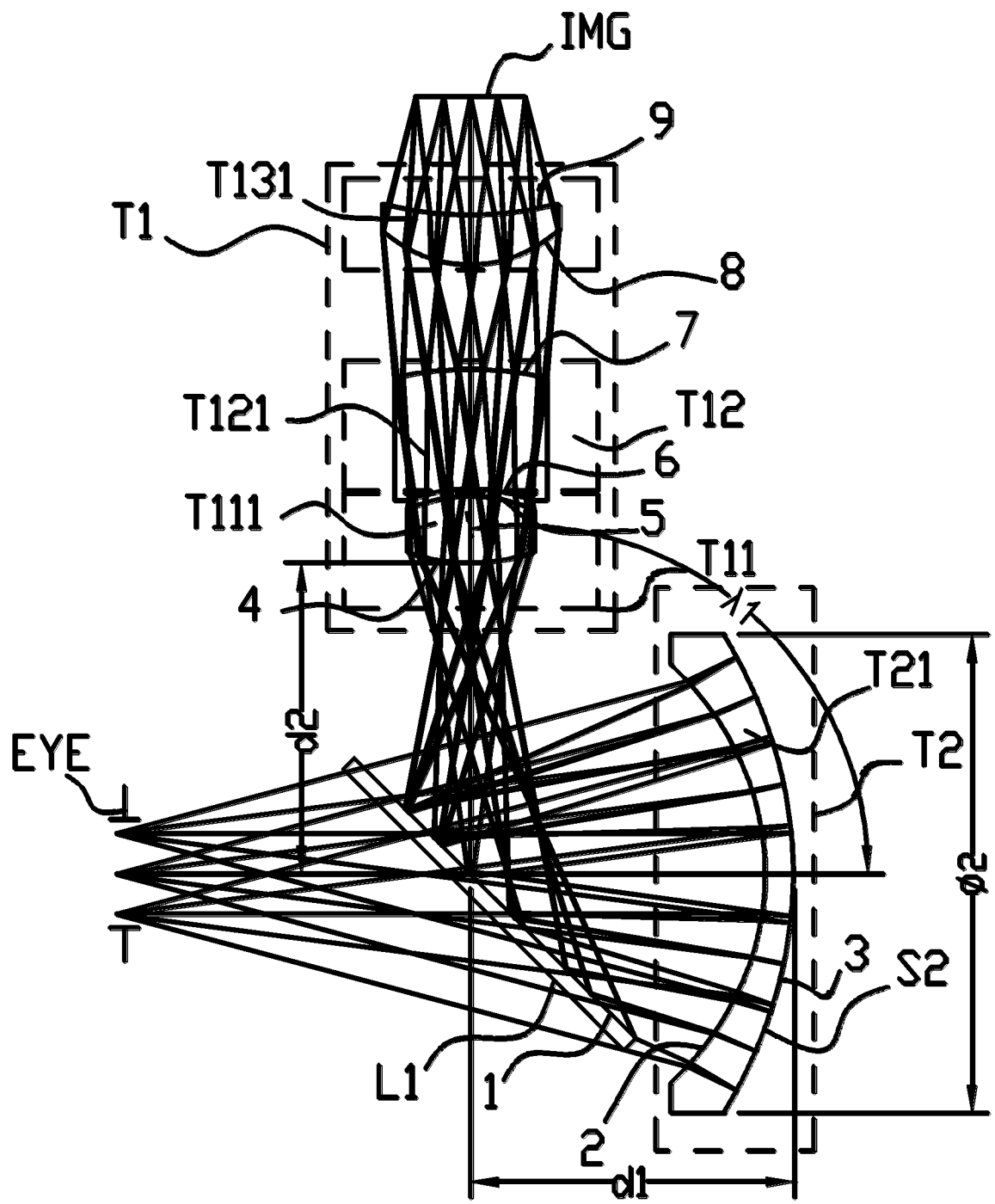
FIG. 1 is an optical path diagram of a reflective eyepiece optical system according to a first embodiment of the present invention.
Figure 2:
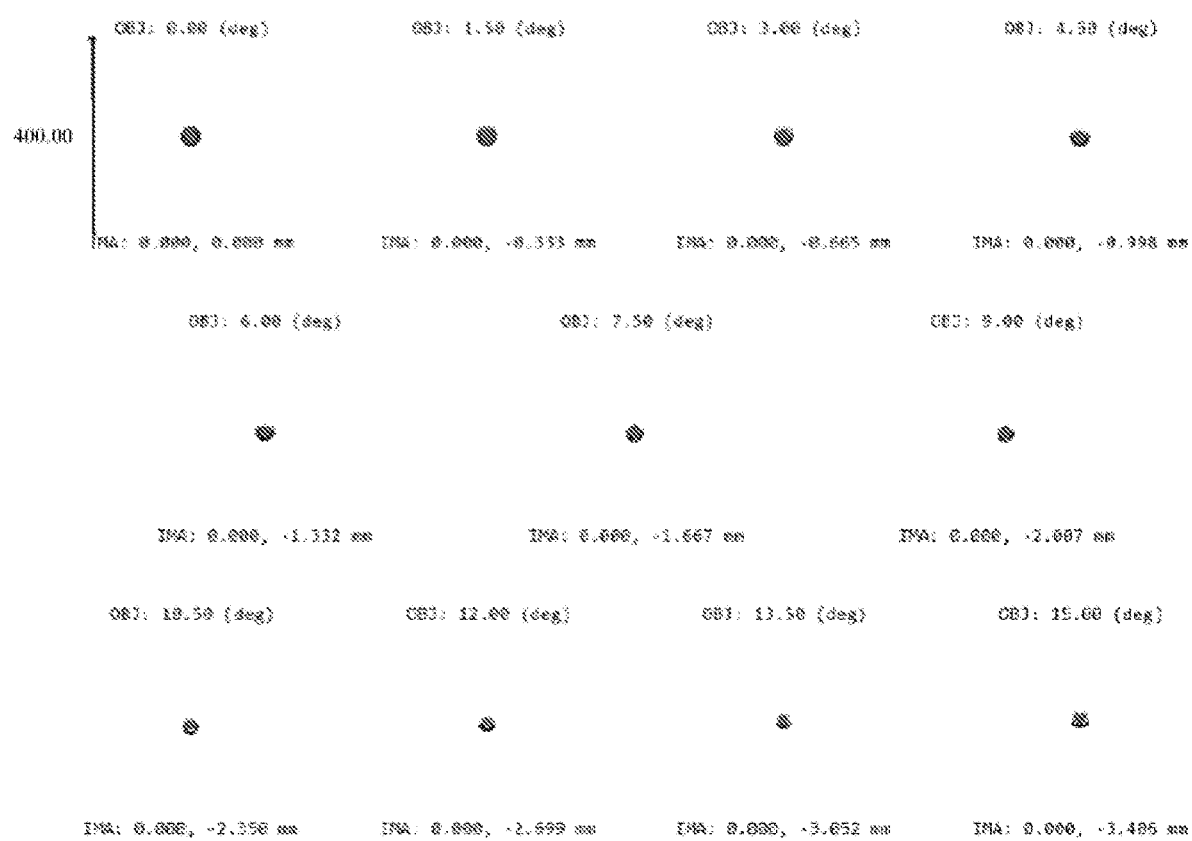
FIG. 2 is a schematic spot diagram of the reflective eyepiece optical system according to the first embodiment of the present invention.
Figure 3A:
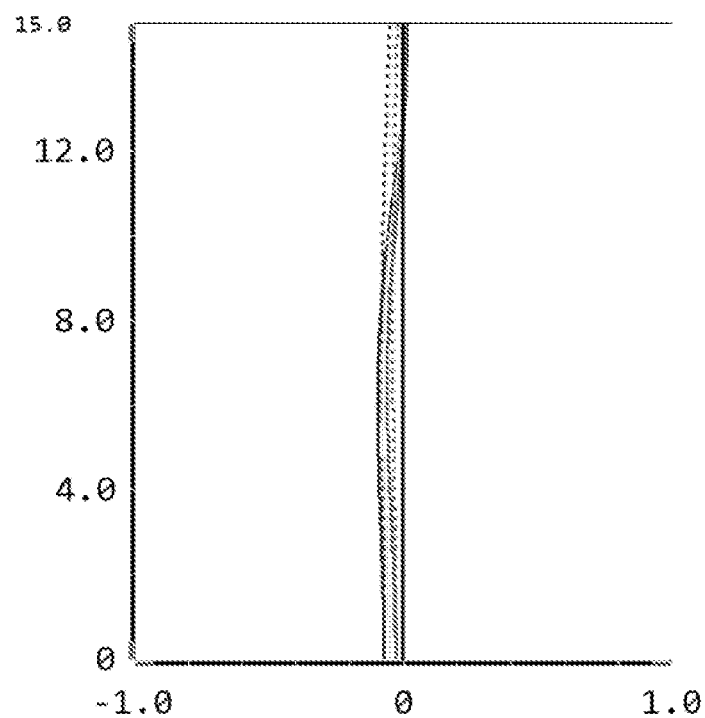
FIG. 3a is a schematic diagram of a field curvature of the reflective eyepiece optical system according to the first embodiment of the present invention.
Figure 3B:
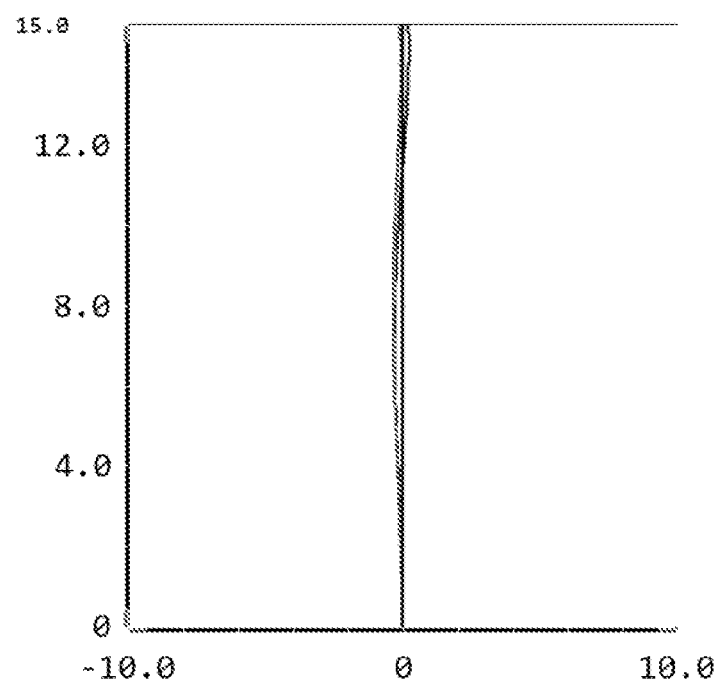
FIG. 3b is a schematic diagram of a distortion of the reflective eyepiece optical system according to the first embodiment of the present invention.
Figure 4:
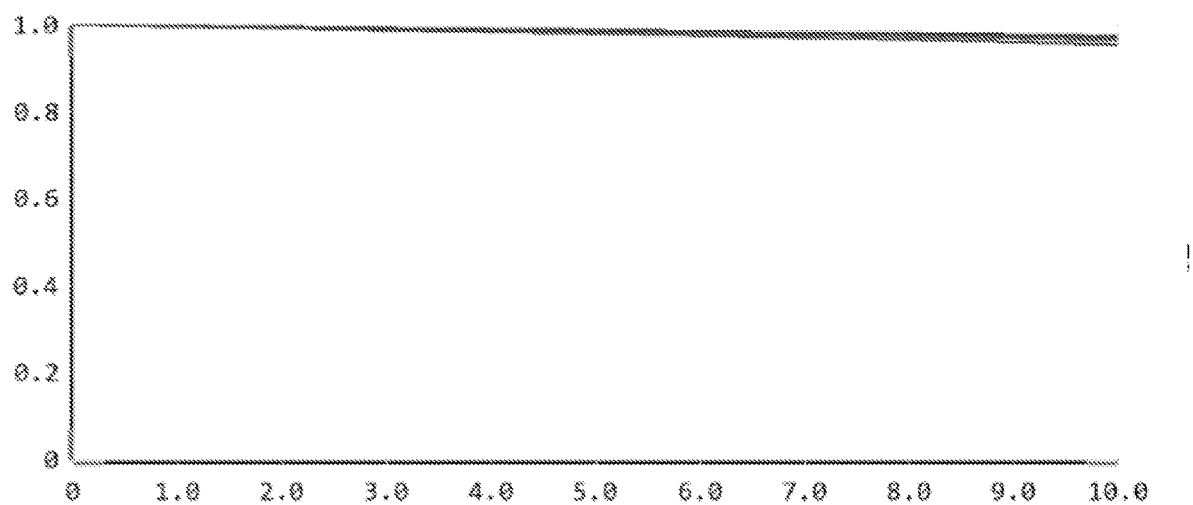
FIG. 4 is a schematic diagram of an optical modulation transfer function (MTF) of the reflective eyepiece optical system according to the first embodiment of the present invention.

In order to clarify the objects, technical solutions and advantages of the embodiments of the present invention, the following clear and complete description will be made for the technical solution in the embodiments of the present invention. Apparently, the described embodiments are just some rather than all embodiments of the present invention. All other embodiments obtained by one of ordinary skill in the art without any creative effort based on the embodiments disclosed in the present invention fall into the scope of the present invention.

The present invention constructs a reflective eyepiece optical system, including a first lens group, and a first optical element and a second lens group for transmitting and reflecting a light from a miniature image displayer. The second lens group includes an optical reflection surface, and the optical reflection surface is an optical surface farthest from a human eye viewing side in the second lens group. The optical reflection surface is concave to the human eye viewing direction. The first optical element reflects the light refracted by the first lens group to the second lens group, and then transmits the light refracted, reflected, and refracted by the second lens group to the human eyes.

The above light transmission path is as follows: a light generated by the miniature image displayer is refracted by the first lens group and then transmitted to the first optical element, and a reflection part on the first optical element reflects the light into the second lens group. The optical reflection surface in the second lens group is arranged on an optical surface farthest from the human eye viewing side, and therefore, the light will be refracted once in the second lens group before entering the optical reflection surface. When the light reaches the optical reflection surface, it will be reflected by the optical reflection surface onto the first optical element. Before the light reflected by the optical reflection surface reaches the first optical element, it will be refracted onto the first optical element through another optical surface in the second lens group, and a light-transmitting part on the first optical element will transmit the light to the human eyes.

An effective focal length of the eyepiece optical system is $f_w$, an effective focal length of the first lens group is $f_1$, an effective focal length of the second lens group is $f_2$, and $f_w$, $f_1$, $f_2$ satisfy the following relations (1) and (2):

$$f_1/f_w < -0.47 \quad (1);$$

$$-2.53 < f_2/f_w < -0.64 \quad (2);$$

wherein, a value of $f_1/f_w$ may be −100.57, −56.55, −33.351, −21.131, −10.951, −7.935, −5.815, −3.615, −1.589, −0.47, etc., and a value of $f_2/f_w$ may be −2.53, −2.521, −2.13, −1.99, −1.55, −1.21, −1.02, −0.98, −0.875, −0.753, −0.649, −0.64, etc.

The first lens group includes a first sub-lens group, a second sub-lens group, and a third sub-lens group arranged coaxially and successively along an optical axis from the human eye viewing side to the miniature image displayer side; effective focal lengths of the first sub-lens group, the second sub-lens group, and the third sub-lens group are a combination of positive, negative, and positive; the effective focal length of the first sub-lens group is $f_{11}$, the effective focal length of the second sub-lens group is $f_{12}$, the effective focal length of the third sub-lens group is $f_{13}$, and $f_{11}$, $f_{12}$, $f_{13}$, and $f_1$ satisfy the following relations (3), (4), and (5):

$$0.19 < f_{11}/f_1 \quad (3);$$

$$f_{12}/f_1 < -0.019 \quad (4);$$

$$0.019 < f_{13}/f_1 \quad (5);$$

wherein, a value of $f_{11}/f_1$ may be 0.19, 0.20, 0.39, 0.57, 0.77, 0.89, 1.35, 3.25, 5.56, 36.1, 54.1, 87.6, etc., a value of $f_{12}/f_1$ may be −120.43, −100.47, −77.55, −51.25, −45.33, −21.78, −15.13, −10.55, −7.15, −4.14, −0.13, −0.02, −0.019, etc., and a value of $f_{13}/f_1$ may be 0.019, 0.20, 0.39, 1.99, 5.83, 12.13, 22.54, 35.24, 43.55, 83.59, etc.

In the above relations (1), (2), (3), (4), and (5), value ranges of $f_1/f_w$, $f_2/f_w$, $f_{11}/f_1$, $f_{12}/f_1$, and $f_{13}/f_1$ are closely related to sensitivities of a correction of system aberrations, a processing difficulty of optical elements, and assembly deviations of the optical elements. The value of $f_1/f_w$ in the relation (1) is less than −0.47, which improves the processibility of the optical elements in the system. The value of $f_2/f_w$ in the relation (2) is greater than −2.53, which improves the processibility of the optical elements in the system, while its value is less than −0.64, so that the system aberrations can be fully corrected, thereby achieving higher quality optical effects. The value of $f_{11}/f_1$ in the relation (3) is greater than 0.19, so that the system aberration can be fully corrected, thereby achieving high quality optical effects. The value of $f_{13}/f_1$ in the relation (5) is greater than 0.019, so that the system aberration can be fully corrected, thereby achieving high quality optical effects. The value of $f_{12}/f_1$ in the relation (4) is less than −0.019, which reduces the difficulty of spherical aberrations correction and facilitates the realization of a large optical aperture.

The first lens group includes three sub-lens groups, which are respectively the first sub-lens group, the second sub-lens group, and the third sub-lens group arranged adjacently. The first sub-lens group, the second sub-lens group, and the third sub-lens group adopt a focal length combination of positive, negative, and positive, where the negative lens group corrects aberrations, and the positive lens group provides focused imaging. The combination of respective sub-lens group is relatively complex, which can better correct aberrations, has better processibility, thereby fully correcting the aberrations of the system, and improving the optical resolution of the system.

More importantly, with the transmission and reflection properties of the first optical element and the second lens group, the second lens group has a reflection surface to effectively fold the optical path, which reduces the overall size of the eyepiece optical system, and improves the possibility of subsequent mass production. At the same time, the second lens group and the focal length combination relationship between the first sub-lens group, the second sub-lens group, and the third sub-lens group are arranged to further correct the aberrations, which improves the processibility. On the basis of miniaturization, cost and weight reduction for the article, the aberrations of the optical system are greatly eliminated, and the basic optical indicators are also improved, ensuring high image quality and increasing the size of the picture angle. Therefore, an observer can watch large images of full frame, high definition and uniform image quality without any distortion and get visual experience of high liveness via the present invention, which is suitable for head-mounted near-to-eye display devices and similar devices thereof.

In the above embodiment, the first optical element may be a polarizer with 75% transmission and 25% reflection, or 65% transmission and 35% reflection, or a transflective function.

As shown in FIG. 1, a first optical element, a second lens group, and a first lens group arranged along an optical axis from a human eye viewing side to a miniature image displayer are included. The optical surface closer to the human eye E side is marked as 1, and by analogy (2, 3, 4, 5, 6 . . . respectively from left to right). The light emitted from the miniature image displayer is refracted by the first lens group, and then reflected on the first optical element to the second lens group. After the light is refracted, reflected, and refracted by the second lens group, the light transmitted by the second lens group is transmitted to the human eyes through the first optical element.

In a further embodiment, a distance along the optical axis between the first optical element and the second lens group is $d_1$, a distance along the optical axis between the first optical element and the first lens group is $d_2$, and $d_1$ and $d_2$ satisfy the following relation (6):

$$0.69 < d_2/d_1 \quad (6);$$

wherein, a value of $d_2/d_1$ may be 0.69, 0.695, 0.88, 0.98, 1.55, 2.37, 3.55, 3.88, 3.99, 4.57, 4.89, 4.99, etc.

A lower limit of $d_2/d_1$ in the above relation (6) is greater than 0.69, which reduces the difficulty of correcting an off-axis aberration of the system, and ensures that both a center field-of-view and an edge field-of-view achieve high image quality, so that the image quality in the full frame is uniform.

In a further embodiment, a maximum effective optical aperture of the second lens group is $\varphi_2$, and $\varphi_2$ satisfies the following relation (7):

$$\varphi_2 < 70 \text{ mm} \tag{7}$$

wherein, a value of $\varphi_2$ may be 70, 69, 65, 56, 52, 48, 32, 30, 28, 26, 21, etc., in mm.

In one embodiment, the first sub-lens group is composed of one lens, wherein the first sub-lens group includes a first lens, and the first lens is a positive lens.

In one embodiment, the first sub-lens group is composed of two lenses; wherein the first sub-lens group includes a first lens and a second lens arranged coaxially and successively along the optical axis from the human eye viewing side to the miniature image displayer side; and the first lens and the second lens are both positive lenses. Using the second lens can better correct the field curvature and astigmatism, which is beneficial to achieving a larger field-of-view and higher optical resolution.

In a further embodiment, an effective focal length of the first lens is $f_{111}$, the effective focal length of the first sub-lens group is $f_{11}$, and $f_{111}$ and $f_{11}$ satisfy the following relation (8):

$$0.10 < |f_{111}/f_{11}| \tag{8}$$

wherein, a value of $|f_{111}/f_{11}|$ may be 0.10, 0.11, 0.22, 0.58, 1.32, 1.55, 2.25, 3.57, 5.57, 8.79, 9.91, 10.11, 20.22, etc.

The value of $|f_{111}/f_{11}|$ in the relation (8) is greater than 0.10, so that the system aberration can be fully corrected, thereby achieving high quality optical effects.

In a further embodiment, an optical surface of the first lens proximate to the human eye viewing side is convex to the human eye direction. It may further reduce the size of the eyepiece optical system, improve the image quality of the system, correct the distortion, and improve the aberrations such as astigmatism and field curvature of the system, which is beneficial to the high-resolution optical effect of the eyepiece system with uniform image quality across the full frame.

In a further embodiment, the second sub-lens group includes a third lens adjacent to the first sub-lens group; the third lens is a negative lens; an optical surface of the third lens proximate to the miniature image displayer side is concave to the miniature image displayer; and an effective focal length of the third lens is $f_{121}$, and $f_{121}$ satisfies the following relation (9):

$$f_{121} < -5.38 \tag{9}$$

wherein, a value of $f_{121}$ may be −5.38, −5.39, −6.72, −9.88, −21.32, −41.55, −52.25, −63.57, −75.57, −88.79, −99.91, −110.11, −220.22, etc.

The value of $f_{121}$ in the relation (9) is less than −5.38, so that the system aberration can be fully corrected, thereby achieving higher quality optical effects.

In a further embodiment, the third sub-lens group includes a fourth lens adjacent to the second sub-lens group; the fourth lens is a positive lens; an effective focal length of the fourth lens is $f_{131}$, and $f_{131}$ satisfies the following relation (10):

$$8.82 < f_{131} \tag{10}$$

wherein, a value of $f_{131}$ may be 8.82, 8.83, 9.72, 19.88, 21.32, 41.55, 52.25, 63.57, 75.57, 88.79, 99.91, 110.11, 220.22, etc.

The value of $f_{131}$ in the relation (10) is greater than 8.82, which improves the processibility of the optical elements in the system.

In a further embodiment, the effective focal length $f_{11}$ of the first sub-lens group, the effective focal length $f_{12}$ of the second sub-lens group, the effective focal length $f_{13}$ of the third sub-lens group, and the effective focal length $f_1$ of the first lens group further satisfy the following relations (11), (12), and (13):

$$0.73 < f_{11}/f_1 < 0.83 \tag{11}$$

$$-3.38 < f_{12}/f_1 < -1.90 \tag{12}$$

$$1.32 < f_{13}/f_1 < 1.83 \tag{13}$$

wherein, a value of $f_{11}/f_1$ may be 0.73, 0.737, 0.749, 0.751, 0.755, 0.763, 0.765, 0.778, 0.812, 0.825, 0.829, 0.83, etc.; a value of $f_{12}/f_1$ may be −3.38, −3.36, −3.22, −3.18, −2.51, −2.36, −2.25, −2.15, −2.035, −1.90, etc., and a value of $f_{13}/f_1$ may be 1.32, 1.321, 1.33, 1.39, 1.45, 1.58, 1.697, 1.71, 1.75, 1.79, 1.829, 1.83, etc.

By further optimizing the value ranges of the effective focal lengths of the first sub-lens group, the second sub-lens group, the third sub-lens group, and the system, the optical performance and the difficulty of processing and manufacturing of the optical system are better balanced.

In one embodiment, the second lens group includes a fifth lens adjacent to the first optical element; and the optical reflection surface is located on an optical surface of the fifth lens distant from the human eye viewing side.

In one embodiment, the second lens group includes a fifth lens and a sixth lens adjacent to the first optical element; the fifth lens and the sixth lens are arranged successively in an incident direction of an optical axis of the human eyes; and the optical reflection surface is located on an optical surface of the fifth lens distant from the human eye viewing side.

In a further embodiment, an effective focal length of the optical reflection surface is $f_{S2}$, the effective focal length of the second lens group is $f_2$, and $f_2$ and $f_{S2}$ satisfy the following relation (14):

$$0.46 \leq f_{S2}/f_2 \leq 1.0 \tag{14}$$

wherein, a value of $f_{S2}/f_2$ may be 0.46, 0.465, 0.467, 0.5, 0.65, 0.75, 0.87, 0.93, 0.97, 1.0, etc.

The value of $f_{S2}/f_2$ in the relation (15) is greater than 0.46, so that the system aberrations can be fully corrected, thereby achieving high quality optical effects, while the value thereof is less than 1.0, which improves the processibility of the optical elements in the system.

In a further embodiment, the first optical element is a planar transflective optical element, a reflectivity of the first optical element is $Re_1$, and $Re_1$ satisfies the following relation (15):

$$20\% < Re_1 < 80\% \tag{15}$$

wherein, a value of $Re_1$ may be 20%, 21%, 30%, 47%, 52%, 60%, 65%, 70%, 79%, 80%, etc.

In a further embodiment, a reflectivity of the optical reflection surface is $Re_2$, and $Re_2$ satisfies the following relation (16):

$$20\% < Re_2 \tag{16}$$

wherein, a value of $Re_2$ may be 20%, 21%, 30%, 47%, 52%, 60%, 65%, 70%, 80%, 99%, etc.

In a further embodiment, an angle of optical axis between the first lens group and the second lens group is $\lambda_1$, and $\lambda_1$ satisfies the following relation (17):

$$55° < \lambda_1 < 120° \tag{17}$$

wherein, a value of $\lambda_1$ may be 55°, 60°, 66°, 70°, 90°, 100°, 115°, 120°, etc.

In a further embodiment, the eyepiece optical system further includes a planar reflective optical element located between the first lens group and the first optical element; the planar reflective optical element reflects the light refracted by the first lens group to the first optical element, the first optical element reflects the light to the second lens group, and then transmits the light refracted, reflected, and refracted by the second lens group to the human eyes.

An included angle between the first lens group and the first optical element is $\lambda_2$, and $\lambda_2$ satisfies the following relation (18):

$$60° \leq \lambda_2 \leq 180° \tag{18};$$

wherein, a value of $\lambda_2$ may be 60°, 74°, 80°, 90°, 100°, 130°, 140°, 155°, 167°, 180°, etc.

In a further embodiment, the first lens group includes one or more even-order aspherical face shapes; and the optical reflection surface is an even-order aspherical face shape.

In the above embodiment, optical surfaces of the fourth lens and the fifth lens are both even-order aspherical face shapes.

In a further embodiment, the even-order aspherical face shape satisfies the following relation (19):

$$z = \frac{cr^2}{1 + \sqrt{1 - (1+k)c^2 r^2}} + \alpha_2 r^2 + \alpha_4 r^4 + \alpha_6 r^6 + \ldots ; \tag{19}$$

wherein, z is a vector height of the optical surface, c is a curvature at the aspherical vertex, k is an aspherical coefficient, α2, 4, 6 . . . are coefficients of various orders, and r is a distance coordinate from a point on a curved surface to an optical axis of a lens system.

The aberrations (including spherical aberration, coma, distortion, field curvature, astigmatism, chromatic aberration, and other higher-order aberrations) of the optical system are fully corrected, which is beneficial for the eyepiece optical system, while realizing a large angle of view and a large aperture, to further improve the image quality of the central field-of-view and the edge field-of-view, and reduce the image quality difference between the central field-of-view and the edge field-of-view, thereby achieving more uniform image quality and low distortion in the full frame.

In a further embodiment, the material of various lenses in the second lens group is an optical plastic material, such as E48R, EP5000, and OKP1.

Therefore, the aberrations at all levels of the eyepiece optical system are fully corrected, and the manufacturing cost of the optical element and the weight of the optical system are also controlled.

The principles, solutions, and display results of the above eyepiece optical system will be further described below through more specific embodiments.

In the following examples, a diaphragm E may be the exit pupil of imaging for the eyepiece optical system, which is a virtual light exit aperture. When the pupils of the human eyes are at the diaphragm position, the best imaging effect can be observed. The spot diagram provided in the following embodiment reflects a geometric structure of the imaging of the optical system, ignores the diffraction effect, and is represented by defocused spots formed by the cross-section of the focused image plane with the specified field-of-view and the light of the specified wavelength, which can include multiple fields-of-view and light of multiple wavelengths at the same time. Therefore, the quality of the imaging quality of the optical system can be directly measured by the density, shape, and size of the defocused spots of the spot diagram, and the chromatic aberration of the optical system can be directly measured by the dislocation degree of the defocused spots with different wavelengths of the spot diagram. A smaller Root Mean Square (RMS) radius of the spot diagram results in a higher imaging quality of the optical system.

Example 1

The eyepiece design data of Example 1 is shown below in Table 1:

TABLE 1

| Surface | Curvature radius (mm) | Thickness (mm) | Lens Refractive index | Abbe number | Net aperture (mm) | Cone coefficient |
|---|---|---|---|---|---|---|
| Diaphragm | Infinite | 40.3031 | | | 4 | |
| 2 | −16.96093 | 1.736031 | 1.57249 | 57.520834 | 24.01287 | −0.1620421 |
| 3 | −22.93898 | −1.736031 | | reflection | 26.97045 | −0.5407947 |
| 4 | −16.96093 | −18.3031 | | | 23.56667 | −0.1620421 |
| 5 | Infinite | 19.3693 | | reflection | 29.06041 | |
| 6 | 7.028656 | 4.162385 | 1.59349 | 67.326618 | 7.640409 | −0.9049099 |
| 7 | −17.32608 | 0.4661416 | | | 7.91517 | −1.079601 |
| 8 | −10.31808 | 7.445772 | 1.66059 | 20.401227 | 7.705375 | |
| 9 | −21.31338 | 6.513479 | | | 9.47091 | |
| 10 | 8.076275 | 3.100757 | 1.53323 | 56.175258 | 11.00162 | |
| 11 | 21.67942 | 7.36649 | | | 10.22678 | |
| Image plane | Infinite | | | | 6.814542 | |

FIG. 1 is an optical path diagram of an eyepiece optical system according to Example 1, including a first lens group T1, and a first optical element L1 and a second lens group T2 for transmitting and reflecting a light from a miniature image displayer (IMG). The second lens group T2 includes an optical reflection surface S2, and the optical reflection surface S2 is an optical surface farthest from a human eye viewing side in the second lens group T2. The optical reflection surface S2 is concave to the human eye viewing direction. The first optical element L1 reflects the light refracted by the first lens group T1 to the second lens group T2, and then transmits the light refracted, reflected, and refracted by the second lens group T2 to the human eyes EYE.

The first lens group T1 includes a first sub-lens group T11, a second sub-lens group T12, and a third sub-lens group T13. The first sub-lens group T11 is a positive lens group, the second sub-lens group T12 is a negative lens group, and the third sub-lens group T13 is a positive lens group. The first sub-lens group T11 is composed of a first lens T111, and the first lens T111 is a positive lens. The second sub-lens group T12 is composed of a third lens T121, and the third lens T121 is a negative lens. The third sub-lens group T13 is composed of a fourth lens T131, and the fourth lens T131 is a positive lens. The second lens group T2 is composed of a fifth lens T21, where the optical reflection surface S2 is located on an optical surface of the fifth lens T21 distant from a human eye EYE viewing side. The optical reflection surface S2 is concave to the human eye viewing direction.

An effective focal length $f_w$ of the eyepiece optical system is −25.58, an effective focal length $f_1$ of the first lens group T1 is 12.28, an effective focal length $f_2$ of the second lens group T2 is 16.63, and an effective focal length $f_{S2}$ of the optical reflection surface S2 is 8.59. A distance $d_1$ along the optical axis between the first optical element L1 and the second lens group T2 is 20, and a distance $d_2$ along the optical axis between the first optical element L1 and the first lens group T1 is 19.37. An effective focal length $f_1$ of the first sub-lens group T11 is 9.09, an effective focal length $f_{12}$ of the second sub-lens group T12 is −41.44, and an effective focal length $f_{13}$ of the third sub-lens group T13 is 22.37. Then, $f_1/f_w$ is −0.48, $f_2/f_w$ is −0.65, $f_{11}/f_1$ is 0.74, $f_{111}/f_{11}$ is 1, $f_{12}/f_1$ is −3.37, $f_{13}/f_1$ is 1.82, $f_{121}$ is −41.44, $f_{S2}/f_2$ is 0.47, $d_2/d_1$ is 0.97, and $\lambda_1$ is 90°.

FIG. 2, FIG. 3a, FIG. 3b, and FIG. 4 are respectively the spot diagram, the field curvature diagram, the distortion diagram, and the transfer function MTF plot, reflecting that respective field-of-view light in this example has high resolution and small optical distortion in the unit pixel of the image plane (miniature image displayer (IMG)). The resolution per 10 mm per unit period reaches more than 0.9. The aberrations of the optical system and image drift are well corrected, and a display portrait of uniformity and high optical performance can be observed through the eyepiece optical system.

Example 2

The eyepiece design data of Example 2 is shown below in Table 2:

TABLE 2

| Surface | Curvature radius (mm) | Thickness (mm) | Lens Refractive index | Abbe number | Net aperture (mm) | Cone coefficient |
|---|---|---|---|---|---|---|
| Diaphragm | Infinite | 40.5102 | | | 4 | |
| 2 | −16.27276 | 4.920357 | 1.4565 | 90.269745 | 23.76394 | 0.2478572 |
| 3 | 78.88 | 0.2 | | | | |
| 4 | 78.88 | 3.8 | 1.4565 | 90.269745 | | |
| 5 | −26.6424 | −8.920357 | | reflection | 34.1208 | −1.71426 |
| 6 | 78.88 | −3.8 | 1.4565 | 90.269745 | | |
| 7 | 78.88 | −0.2 | | | | |
| 8 | −16.27276 | −18.51022 | | | 22.71741 | 0.2478572 |
| 9 | Infinite | 19.3693 | | reflection | 27.23839 | |
| 10 | 7.300024 | 5.540395 | 1.5928 | 68.345897 | 7.290903 | −0.7107763 |
| 11 | −15.95141 | 0.4916508 | | | 7.837859 | 0.2964754 |
| 12 | −10.01868 | 1.864454 | 1.66059 | 20.401227 | 7.762297 | |
| 13 | −27.11311 | 8.147842 | | | 8.519386 | |
| 14 | 12.72523 | 2.978709 | 1.734852 | 48.782341 | 11.84104 | |
| 15 | 241.901 | 9.982644 | | | 11.43652 | |
| Image plane | Infinite | | | | 7.360923 | |

Figure 5:
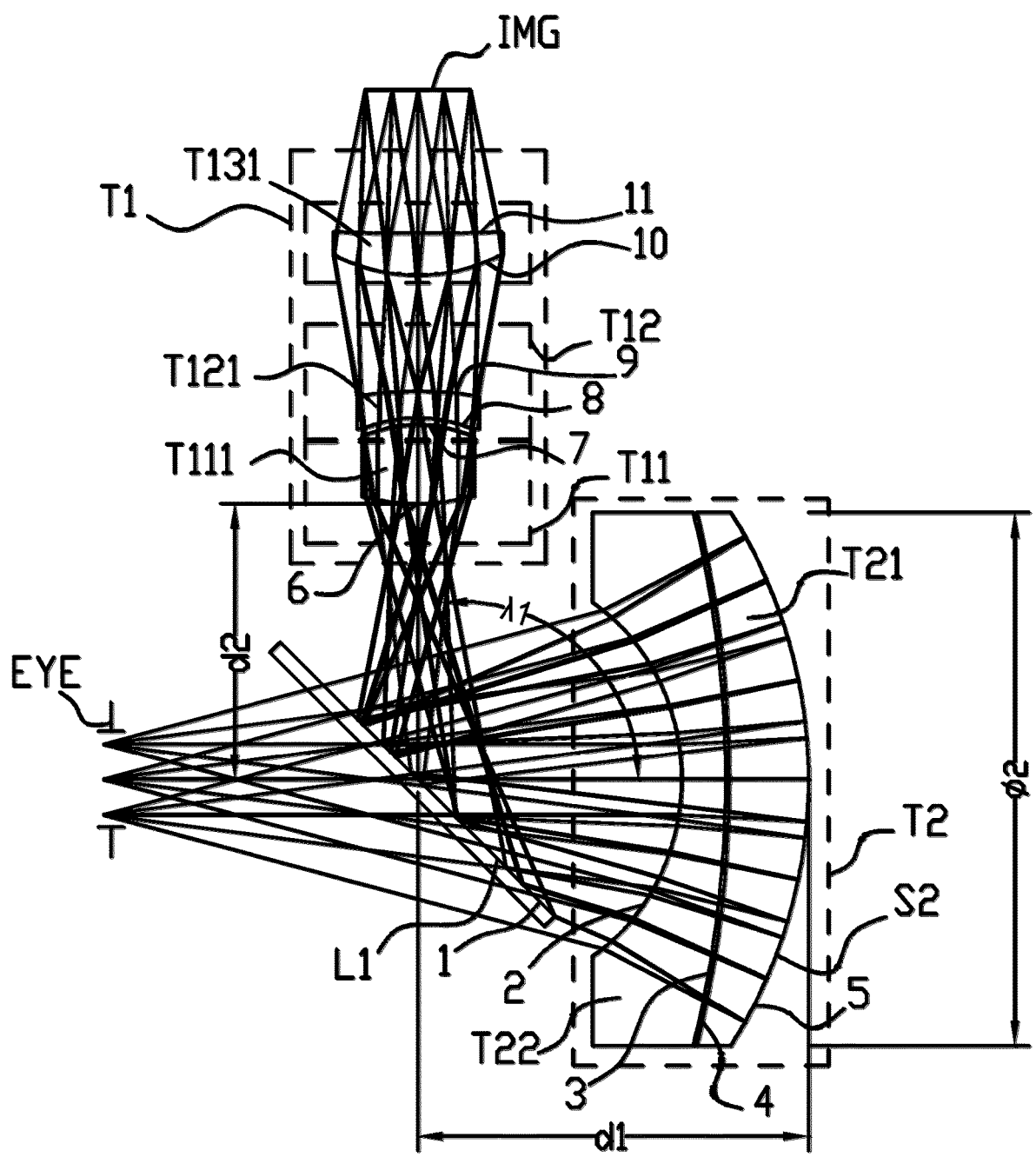
FIG. 5 is an optical path diagram of a reflective eyepiece optical system according to a second embodiment of the present invention.
Figure 6:
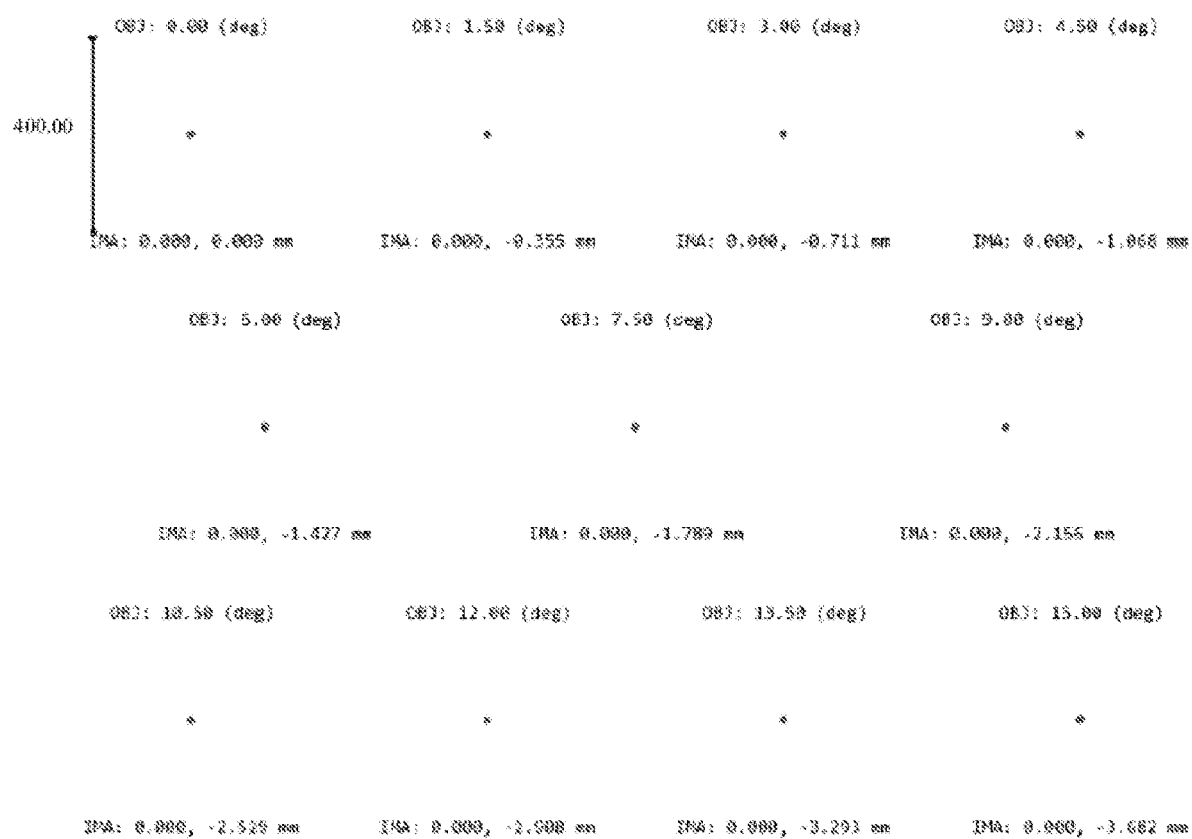
FIG. 6 is a schematic spot diagram of the reflective eyepiece optical system according to the second embodiment of the present invention.
Figure 7A:
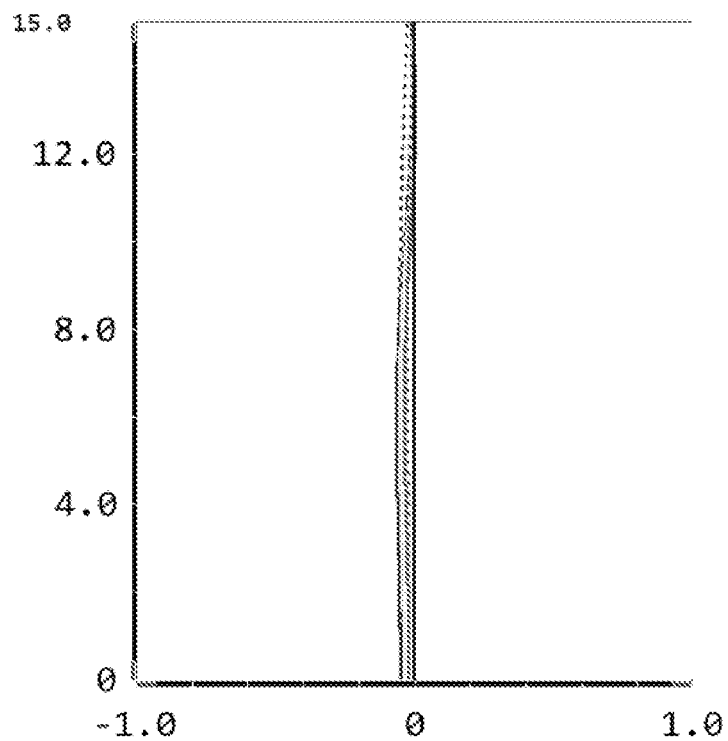
FIG. 7a is a schematic diagram of a field curvature of a reflective eyepiece optical system according to the second embodiment of the present invention.
Figure 7B:
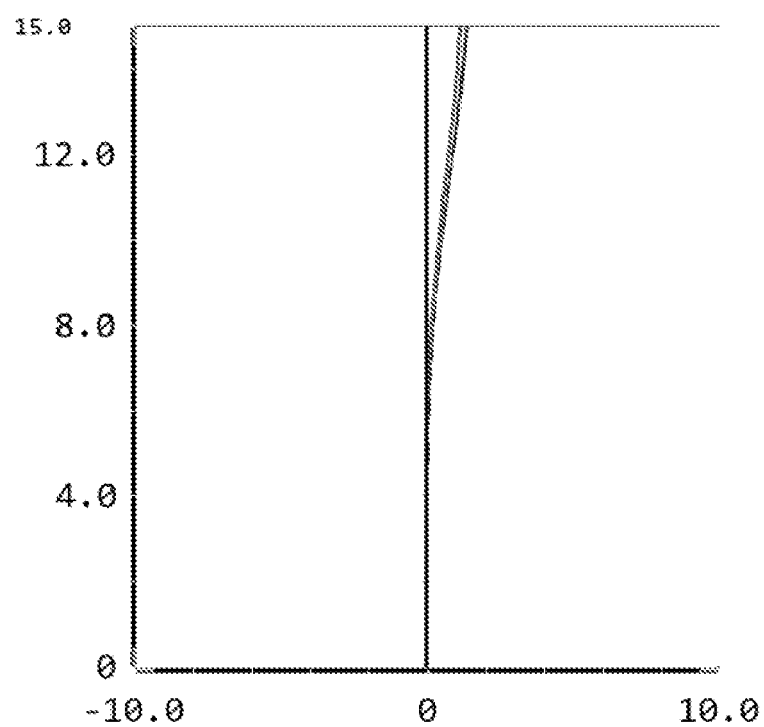
FIG. 7b is a schematic diagram of a distortion of the reflective eyepiece optical system according to the second embodiment of the present invention.
Figure 8:
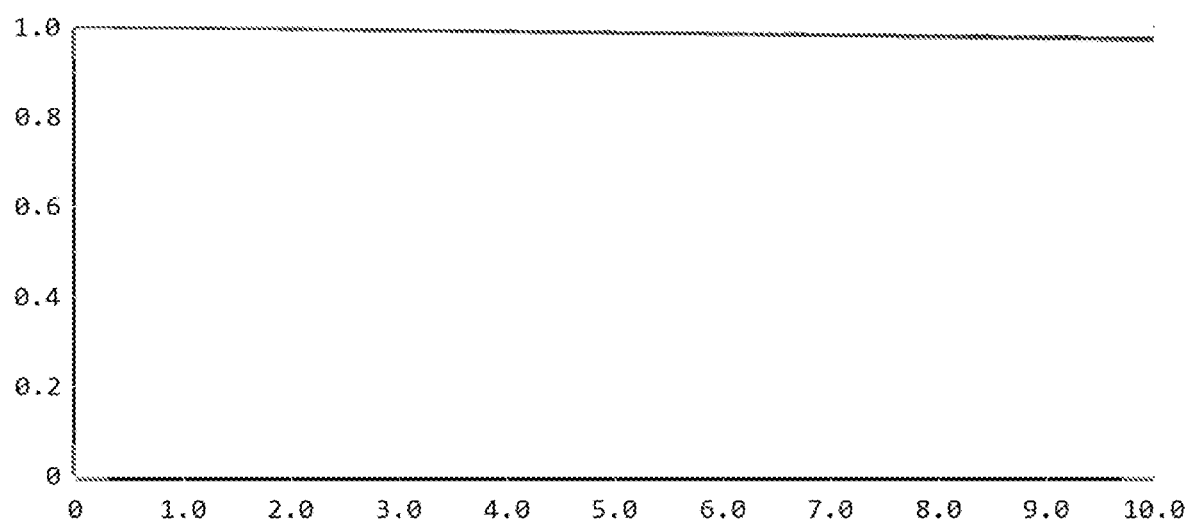
FIG. 8 is a schematic diagram of an optical MTF of the reflective eyepiece optical system according to the second embodiment of the present invention.

FIG. 5 is an optical path diagram of an optical system according to Example 2, including a first lens group T1, and a first optical element L1 and a second lens group T2 for transmitting and reflecting a light from a miniature image displayer (IMG). The second lens group T2 includes an optical reflection surface S2, and the optical reflection surface S2 is an optical surface farthest from a human eye viewing side in the second lens group T2. The optical reflection surface S2 is concave to the human eye viewing direction. The first optical element L1 reflects the light refracted by the first lens group T1 to the second lens group T2, and then transmits the light refracted, reflected, and refracted by the second lens group T2 to the human eyes EYE.

The first lens group T1 includes a first sub-lens group T11, a second sub-lens group T12, and a third sub-lens group T13. The first sub-lens group T11 is a positive lens group, the second sub-lens group T12 is a negative lens group, and the third sub-lens group T13 is a positive lens group. The first sub-lens group T11 is composed of a first lens T111, and the first lens T111 is a positive lens. The second sub-lens group T12 is composed of a third lens T121, and the third lens T121 is a negative lens. The third sub-lens group T13 is composed of a fourth lens T13i, and the fourth lens T13i is a positive lens. The second lens group T2 includes a fifth lens T21 and a sixth lens T22 arranged successively in an incident direction of the optical axis of the human eyes, where the optical reflection surface S2 is located on an optical surface of the fifth lens T21 distant from the human eye EYE viewing side. The optical reflection surface S2 is concave to the human eye viewing direction.

An effective focal length $f_w$ of the eyepiece optical system is −13.58, an effective focal length $f_1$ of the first lens group T1 is 13.15, an effective focal length $f_2$ of the second lens group T2 is 20.33, and an effective focal length $f_{S2}$ of the optical reflection surface S2 is 11.95. A distance $d_1$ along the optical axis between the first optical element L1 and the second lens group T2 is 27.5, and a distance $d_2$ along the optical axis between the first optical element L1 and the first lens group T1 is 19.37. An effective focal length $f_{11}$ of the first sub-lens group T11 is 10.23, an effective focal length $f_{12}$ of the second sub-lens group is −25.15, and an effective focal length $f_{13}$ of the third sub-lens group T13 is 18.18. Then, $f_1/f_w$ is −0.97, $f_2/f_w$ is −1.50, $f_{11}/f_1$ is 0.78, $f_{111}/f_{11}$ is 1, $f_{12}/f_1$ is −1.91, $f_{13}/f_1$ is 1.38, $f_{21}$ is −25.15, $f_{S2}/f_2$ is 0.59, $d_2/d_1$ is 0.70, and $\lambda_1$ is 90°.

FIG. 6, FIG. 7a, FIG. 7b, and FIG. 8 are respectively the spot diagram, the field curvature diagram, the distortion diagram, and the transfer function MTF plot, reflecting that respective field-of-view light in this example has high resolution and small optical distortion in the unit pixel of the image plane (miniature image displayer (IMG)). The resolution per 10 mm per unit period reaches more than 0.9. The aberrations of the optical system and image drift are well corrected, and a display portrait of uniformity and high optical performance can be observed through the eyepiece optical system.

Example 3

The eyepiece design data of Example 3 is shown below in Table 3:

The first lens group T1 includes a first sub-lens group T11, a second sub-lens group T12, and a third sub-lens group T13. The first sub-lens group T11 is a positive lens group, the second sub-lens group T12 is a negative lens group, and the third sub-lens group T13 is a positive lens group. The first sub-lens group T11 is composed of a first lens T111, and the first lens T111 is a positive lens. The second sub-lens group T12 is composed of a third lens T121, and the third lens T121 is a negative lens. The third sub-lens group T13 is composed of a fourth lens T131, and the fourth lens T131 is a positive lens. The second lens group T2 is composed of a fifth lens T21, where the optical reflection surface S2 is located on an optical surface of the fifth lens T21 distant from a human eye EYE viewing side. The optical reflection surface S2 is concave to the human eye viewing direction.

An effective focal length $f_w$ of the eyepiece optical system is −12.26, an effective focal length $f_1$ of the first lens group T1 is 12.45, an effective focal length $f_2$ of the second lens group T2 is 21.56, and an effective focal length $f_{S2}$ of the optical reflection surface S2 is 10.46. A distance $d_1$ along the optical axis between the first optical element L1 and the second lens group T2 is 22.06, and a distance $d_2$ along the optical axis between the first optical element L1 and the first lens group T1 is 19.37. An effective focal length $f_{11}$ of the first sub-lens group T11 is 10.23, an effective focal length $f_{12}$ of the second sub-lens group T12 is −31.15, and an effective

TABLE 3

| Surface | Lens | | | | | |
| --- | --- | --- | --- | --- | --- | --- |
| | Curvature radius (mm) | Thickness (mm) | Refractive index | Abbe number | Net aperture (mm) | Cone coefficient |
| Diaphragm | Infinite | 47.06129 | | | 4 | |
| 2 | −16.74496 | 2 | 1.4565 | 90.269745 | 28.85042 | −0.02255 |
| 3 | −23.21639 | −2 | | reflection | 34.60251 | −1.502408 |
| 4 | −16.74496 | −25.06129 | | | 28.19016 | −0.022558 |
| 5 | Infinite | 19.3693 | | reflection | 13.12891 | |
| 6 | 6.96182 | 4.594048 | 1.5928 | 68.345897 | 10.82944 | −0.6285626 |
| 7 | −20.07064 | 0.4938801 | | | 11.02016 | 2.218623 |
| 8 | −10.40334 | 2.110673 | 1.66059 | 20.401227 | 10.70842 | |
| 9 | −22.74023 | 9.884766 | | | 11.21306 | |
| 10 | 9.732612 | 8.087125 | 1.734852 | 48.782341 | 13.10219 | |
| 11 | 31.61777 | 3.831748 | | | 9.509127 | |
| Image plane | Infinite | | | | 6.572738 | |

Figure 9:
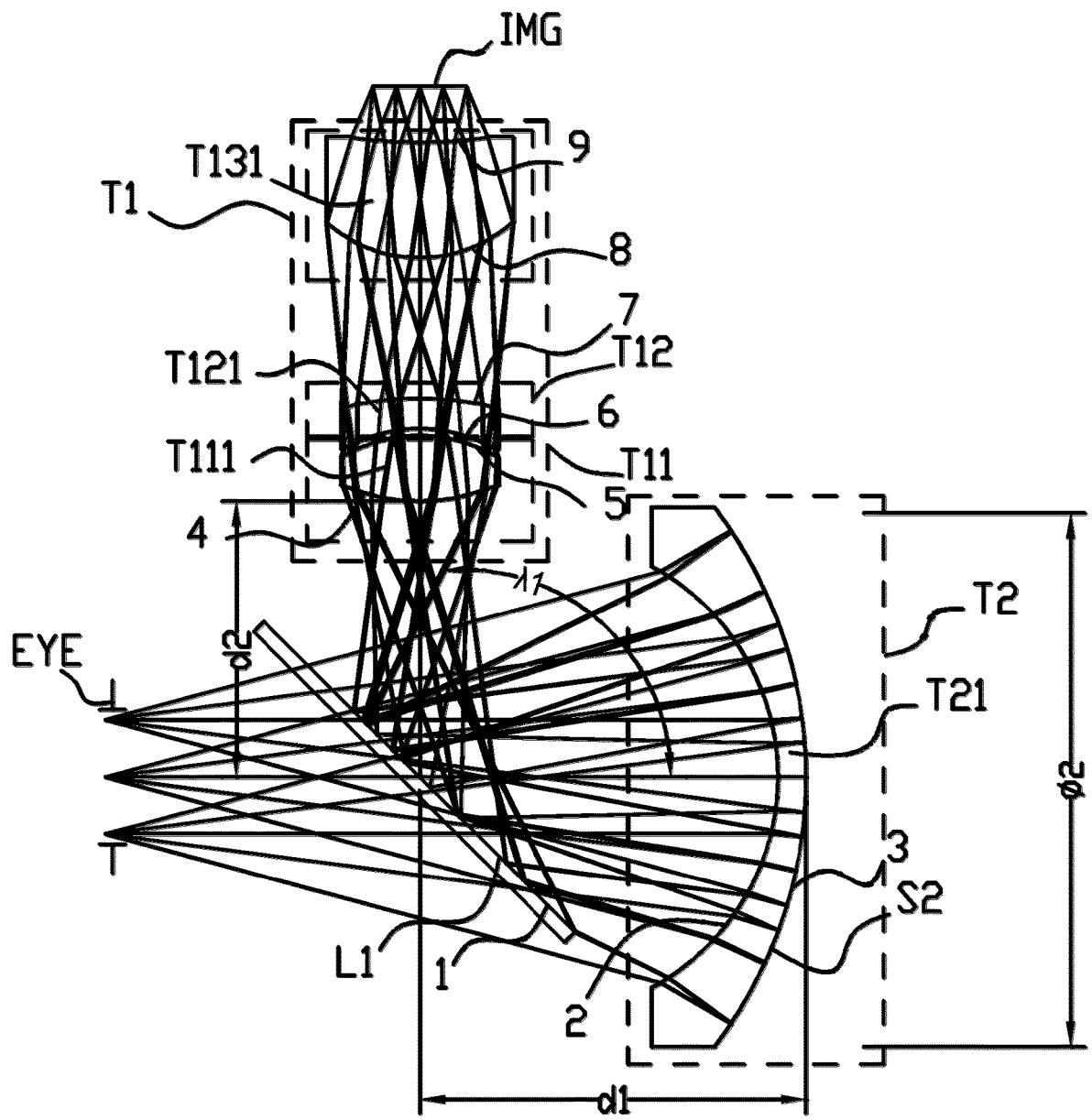
FIG. 9 is an optical path diagram of a reflective eyepiece optical system according to a third embodiment of the present invention.
Figure 10:
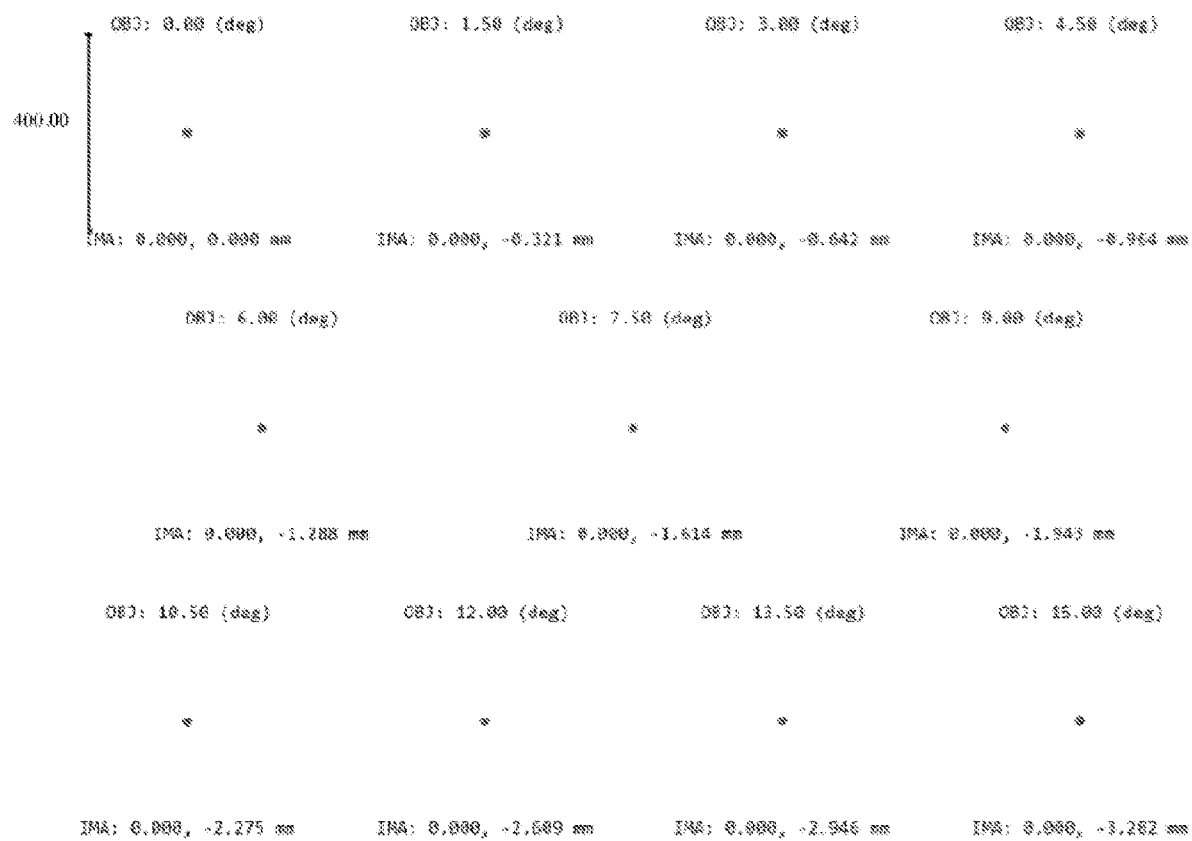
FIG. 10 is a schematic spot diagram of the reflective eyepiece optical system according to the third embodiment of the present invention.
Figure 11A:
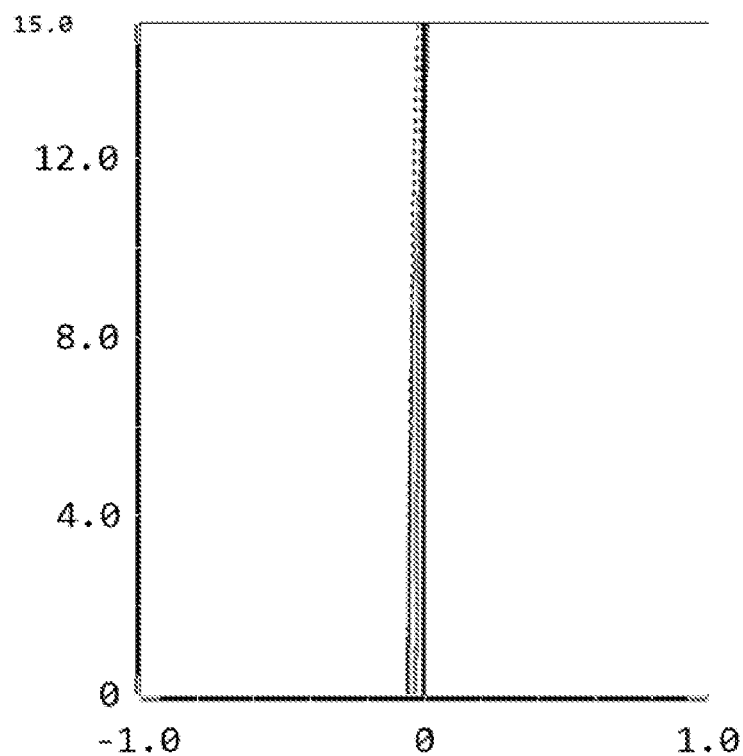
FIG. 11a is a schematic diagram of a field curvature of a reflective eyepiece optical system according to the third embodiment of the present invention.
Figure 11B:
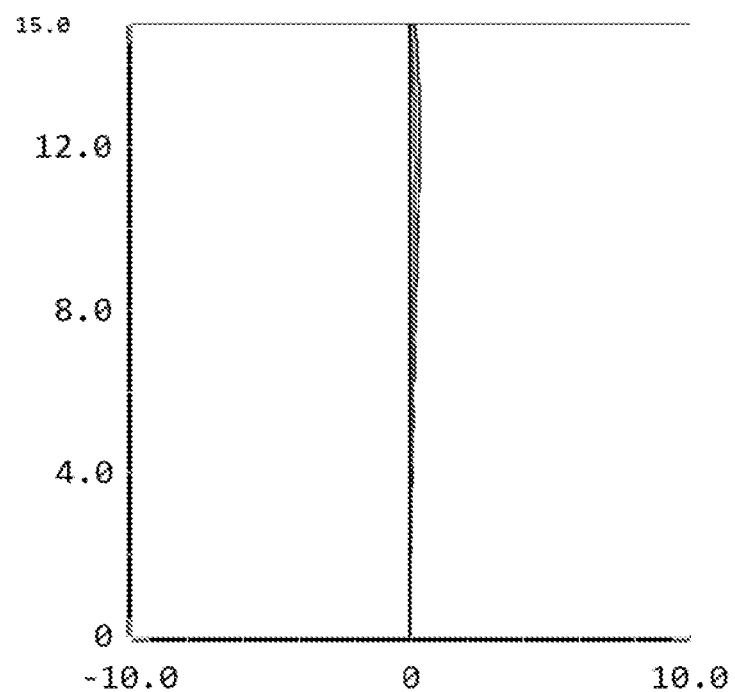
FIG. 11b is a schematic diagram of a distortion of the reflective eyepiece optical system according to the third embodiment of the present invention.
Figure 12:
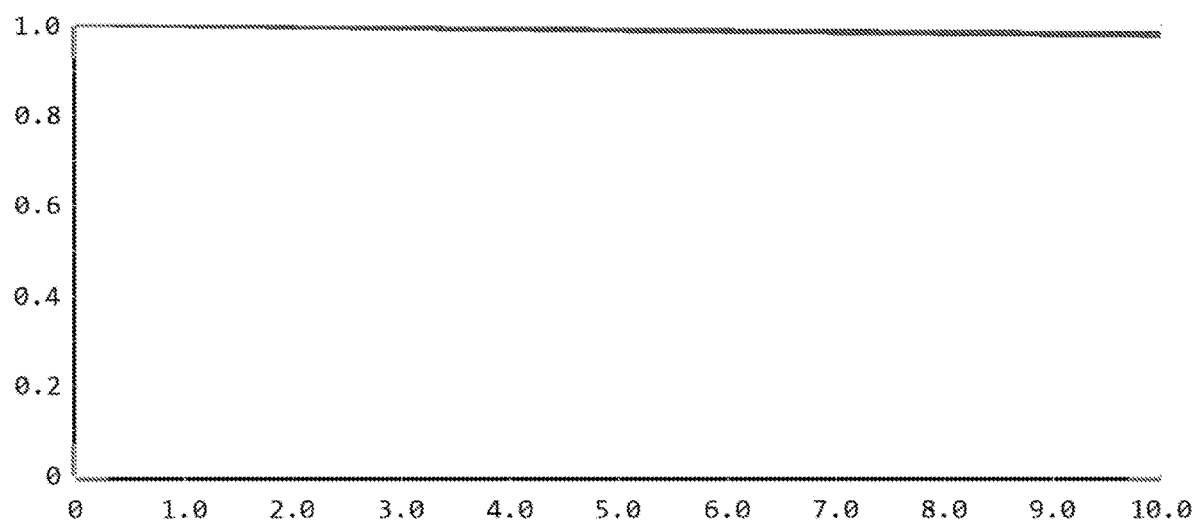
FIG. 12 is a schematic diagram of an optical MTF of the reflective eyepiece optical system according to the third embodiment of the present invention.

FIG. 9 is an optical path diagram of an optical system according to Example 3, including a first lens group T1, and a first optical element L1 and a second lens group T2 for transmitting and reflecting a light from a miniature image displayer (IMG). The second lens group T2 includes an optical reflection surface S2, and the optical reflection surface S2 is an optical surface farthest from a human eye viewing side in the second lens group T2. The optical reflection surface S2 is concave to the human eye viewing direction. The first optical element L1 reflects the light refracted by the first lens group T1 to the second lens group T2, and then transmits the light refracted, reflected, and refracted by the second lens group T2 to the human eyes EYE.

focal length $f_{13}$ of the third sub-lens group T13 is 16.54. Then, $f_1/f_w$ is −1.02, $f_2/f_w$ is −1.76, $f_{11}/f_1$ is 0.82, $f_{111}/f_{11}$ is 1, $f_{12}/f_1$ is −2.5, $f_{13}/f_1$ is 1.33, $f_{21}$ is −31.15, $f_{S2}/f_2$ is 0.49, $d_2/d_1$ is 0.88, and $\lambda_1$ is 90°.

FIG. 10, FIG. 11a, FIG. 11b, and FIG. 12 are respectively the spot diagram, the field curvature diagram, the distortion diagram, and the transfer function MTF plot, reflecting that respective field-of-view light in this example has high resolution and small optical distortion in the unit pixel of the image plane (miniature image displayer (IMG)). The resolution per 10 mm per unit period reaches more than 0.9. The aberrations of the optical system and image drift are well corrected, and a display portrait of uniformity and high optical performance can be observed through the eyepiece optical system.

Example 4

The eyepiece design data of Example 4 is shown below in Table 4:

TABLE 4

| Surface | Curvature radius (mm) | Thickness (mm) | Refractive index | Abbe number | Net aperture (mm) | Cone coefficient |
|---|---|---|---|---|---|---|
| Diaphragm | Infinite | 24 | | | 4 | |
| 2 | −49.36142 | 1.23 | 1.4565 | 90.269745 | 28.85042 | −30.63446 |
| 3 | −49.36142 | −1.23 | | reflection | 16.92878 | −30.63446 |
| 4 | −49.36142 | −12.5 | | | | |
| 5 | Infinite | 13.1334 | | reflection | 16.47546 | |
| 6 | 10.63173 | 6.768553 | 1.470466 | 66.884514 | 11.45823 | 1.642487 |
| 7 | 3.274199 | 11.32313 | | | 6.427964 | −0.032055 |
| 8 | 7.530389 | 3.420425 | 1.6516 | 58.416296 | 6.330415 | −2.823889 |
| 9 | −13.30309 | 0.01089893 | | | 6.564714 | −2.0235 |
| 10 | −6.043257 | 1.444582 | 1.66059 | 20.401227 | 6.441418 | |
| 11 | −26.53271 | 0.5485741 | | | 6.698429 | |
| 12 | 50.10796 | 2.513006 | 1.533232 | 56.175258 | 6.721603 | |
| 13 | −8.1199 | 7.032609 | | | 6.67126 | |
| Image plane | Infinite | | | | 4.694998 | |

Figure 13:
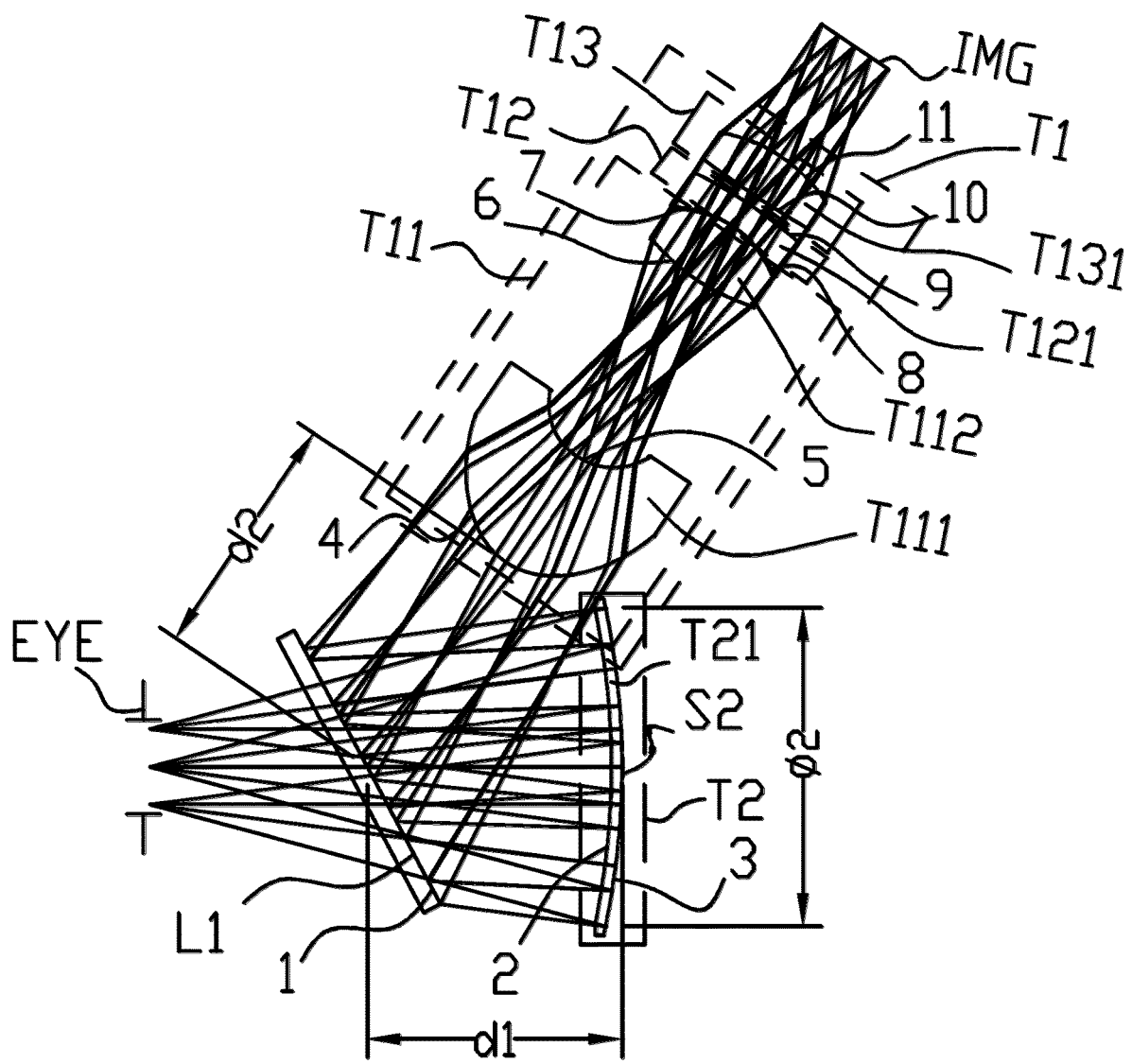
FIG. 13 is an optical path diagram of a reflective eyepiece optical system according to a fourth embodiment of the present invention.
Figure 14:
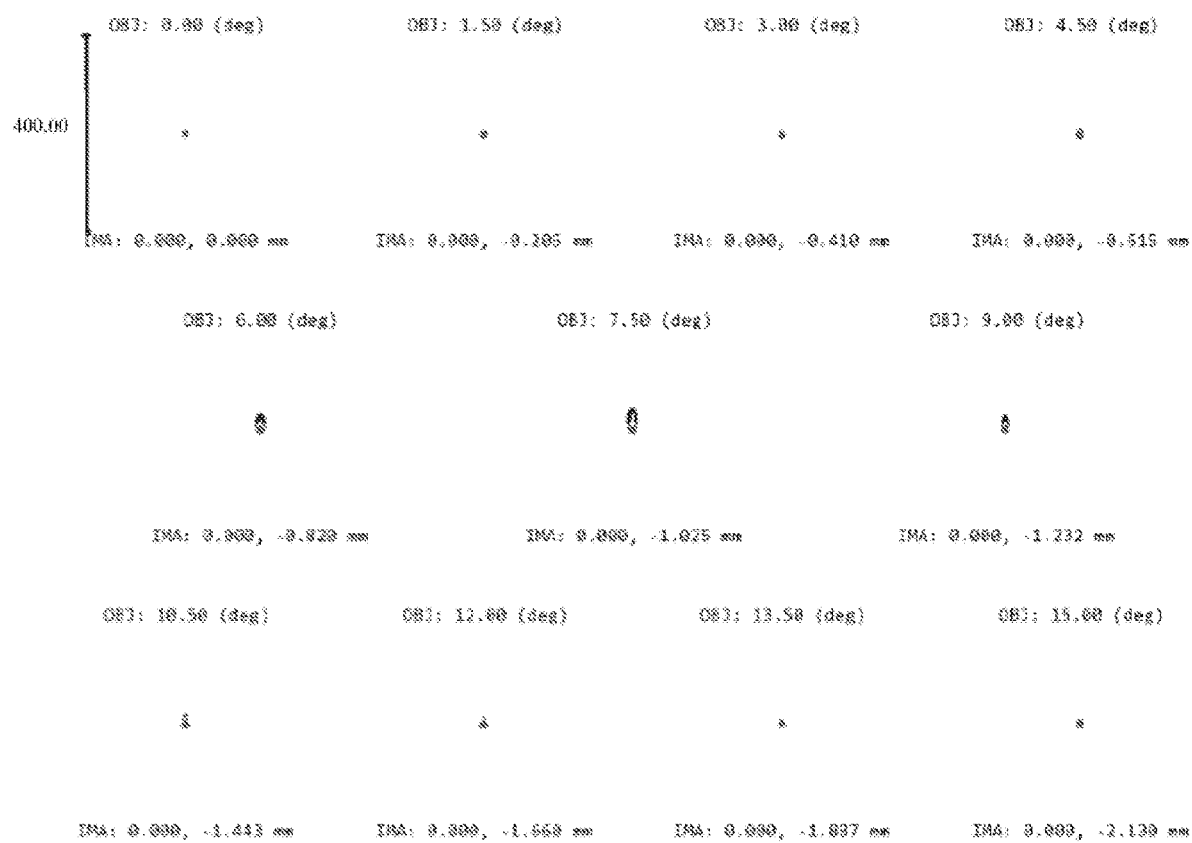
FIG. 14 is a schematic spot diagram of the reflective eyepiece optical system according to the fourth embodiment of the present invention.
Figure 15A:
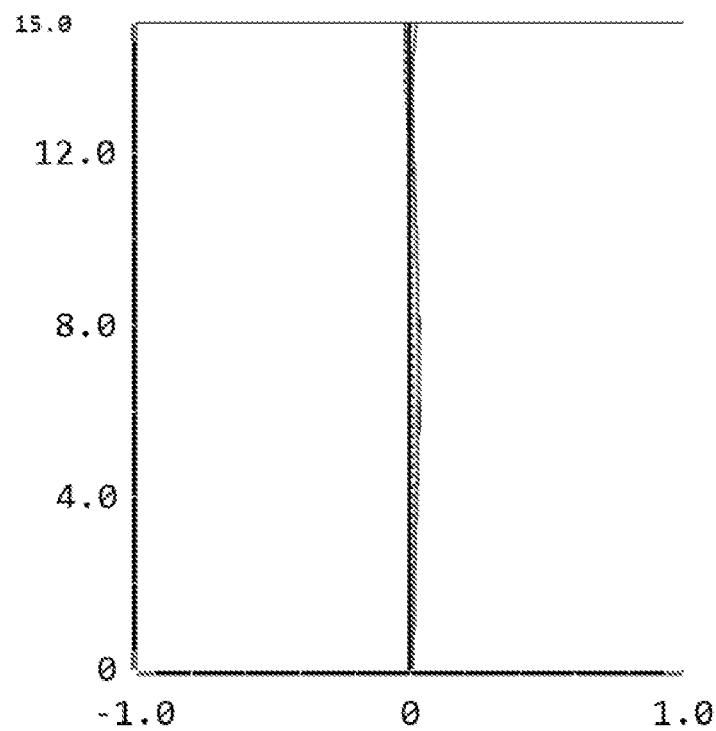
FIG. 15a is a schematic diagram of a field curvature of a reflective eyepiece optical system according to the fourth embodiment of the present invention.
Figure 15B:
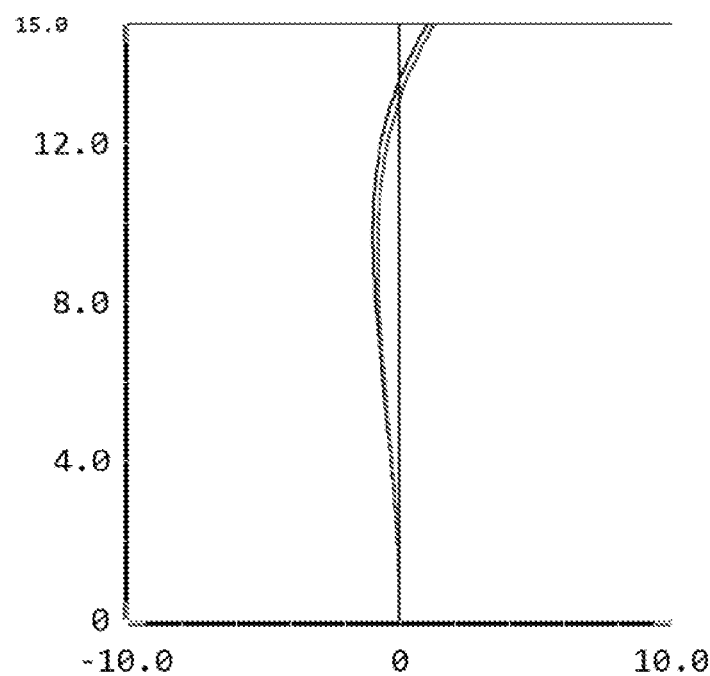
FIG. 15b is a schematic diagram of a distortion of the reflective eyepiece optical system according to the fourth embodiment of the present invention.
Figure 16:
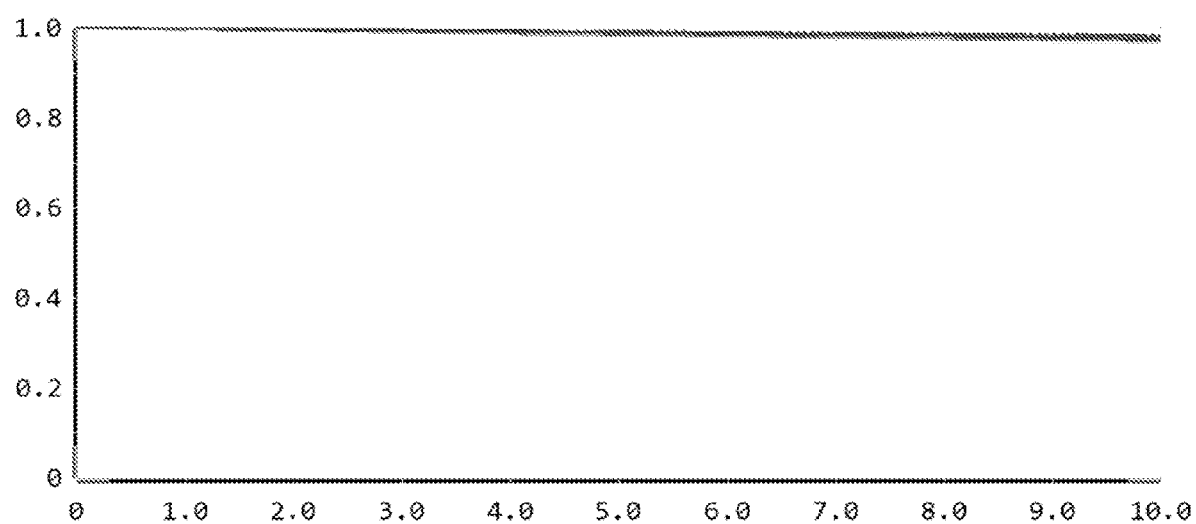
FIG. 16 is a schematic diagram of an optical MTF of the reflective eyepiece optical system according to the fourth embodiment of the present invention.

FIG. 13 is an optical path diagram of an optical system according to Example 4, including a first lens group T1, and a first optical element L1 and a second lens group T2 for transmitting and reflecting a light from a miniature image displayer (IMG). The second lens group T2 includes an optical reflection surface S2, and the optical reflection surface S2 is an optical surface farthest from a human eye viewing side in the second lens group T2. The optical reflection surface S2 is concave to the human eye viewing direction. The first optical element L1 reflects the light refracted by the first lens group T1 to the second lens group T2, and then transmits the light refracted, reflected, and refracted by the second lens group T2 to the human eyes EYE.

The first lens group T1 includes a first sub-lens group T11, a second sub-lens group T12, and a third sub-lens group T13. The first sub-lens group T11 is a positive lens group, the second sub-lens group T12 is a negative lens group, and the third sub-lens group T13 is a positive lens group. The first sub-lens group T11 is composed of a first lens T111 and a second lens T112, and the first lens T111 and the second lens T112 are both positive lenses. The second sub-lens group T12 is composed of a third lens T121, and the third lens T121 is a negative lens. The third sub-lens group T13 is composed of a fourth lens T131, and the fourth lens T131 is a positive lens. The second lens group T2 is composed of a fifth lens T21, where the optical reflection surface S2 is located on an optical surface of the fifth lens T21 distant from the human eye EYE viewing side. The optical reflection surface S2 is concave to the human eye viewing direction.

An effective focal length $f_w$ of the eyepiece optical system is −7.8, an effective focal length $f_1$ of the first lens group T1 is 782.9, an effective focal length $f_2$ of the second lens group T2 is 19.69, and an effective focal length $f_{S2}$ of the optical reflection surface S2 is 19.69. A distance $d_1$ along the optical axis between the first optical element L1 and the second lens group T2 is 12.8, and a distance $d_2$ along the optical axis between the first optical element L1 and the first lens group T1 is 13.83. An effective focal length $f_{11}$ of the first sub-lens group is 154.93, an effective focal length $f_{111}$ of the first lens is 17.29, an effective focal length $f_{12}$ of the second sub-lens group is −12.19, and an effective focal length $f_{13}$ of the third sub-lens group is 13.3. Then, $f_1/f_w$ is −100.37, $f_2/f_w$ is −2.52, $f_{11}/f_1$ is 0.20, $f_{111}/f_{11}$ is 0.11, $f_{12}/f_1$ is −0.02, $f_{13}/f_1$ is 0.02, $f_{121}$ is −12.19, $f_{S2}/f_2$ is 1, $d_2/d_1$ is 1.08, and $\lambda_1$ is 90°.

FIG. 14, FIG. 15a, FIG. 15b, and FIG. 16 are respectively the spot diagram, the field curvature diagram, the distortion diagram, and the transfer function MTF plot, reflecting that respective field-of-view light in this example has high resolution and small optical distortion in the unit pixel of the image plane (miniature image displayer (IMG)). The resolution per 10 mm per unit period reaches more than 0.9. The aberrations of the optical system and image drift are well corrected, and a display portrait of uniformity and high optical performance can be observed through the eyepiece optical system.

Example 5

The eyepiece design data of Example 5 is shown below in Table 5:

TABLE 5

| Surface | Curvature radius (mm) | Thickness (mm) | Refractive index | Abbe number | Net aperture (mm) | Cone coefficient |
|---|---|---|---|---|---|---|
| Diaphragm | Infinite | 35 | | | 4 | |
| 2 | −46.67614 | 2 | 1.4565 | 90.269745 | 28.85042 | −30.63446 |
| 3 | −46.67614 | −2 | | reflection | 16.92878 | −30.63446 |
| 4 | −46.67614 | −15.8 | | | | |
| 5 | Infinite | 17.59 | | reflection | 16.47546 | |

TABLE 5-continued

| Surface | Lens | | | | | |
|---|---|---|---|---|---|---|
| | Curvature radius (mm) | Thickness (mm) | Refractive index | Abbe number | Net aperture (mm) | Cone coefficient |
| 6 | 52.49173 | 3.132752 | 1.746934 | 51.008591 | 9.556477 | 24.59786 |
| 7 | 13.01616 | 0.9286545 | | | 7.78054 | 6.399797 |
| 8 | 22.46667 | 6.510699 | 1.6968 | 55.534184 | 7.621695 | −19.00484 |
| 9 | −29.99283 | 0.4835252 | | | 5.64488 | 20.72191 |
| 10 | 11.6405 | 3.384979 | 1.672707 | 32.180986 | 4.395748 | |
| 11 | 10.21003 | 4.078799 | | | 4.380214 | |
| 12 | 9.653885 | 5.227399 | 1.613095 | 60.614383 | 9.892366 | |
| 13 | −119.9915 | 5.717896 | | | 10.41139 | |
| Image plane | Infinite | | | | 11.53956 | |

Figure 17:
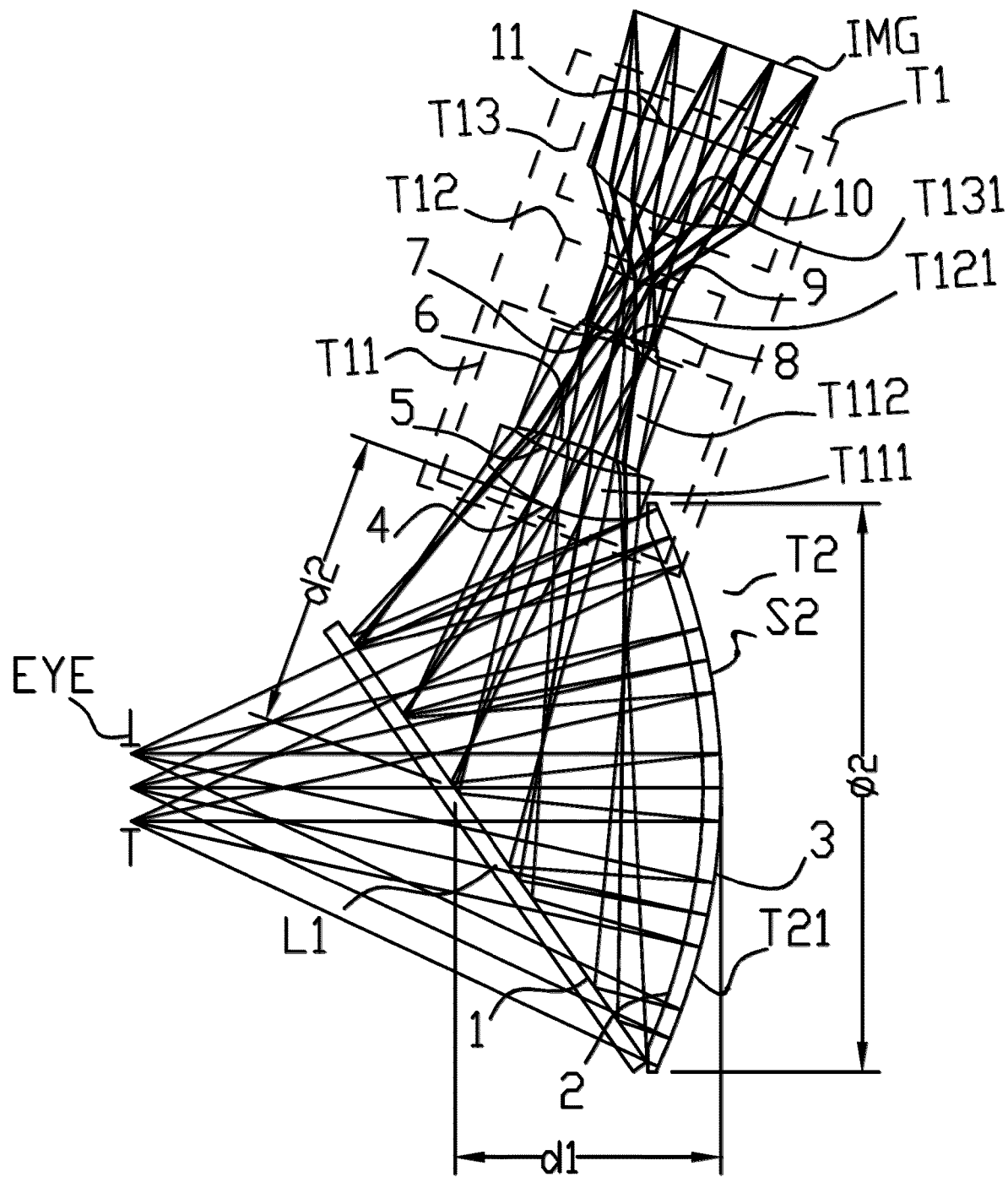
FIG. 17 is an optical path diagram of a reflective eyepiece optical system according to a fifth embodiment of the present invention.
Figure 18:
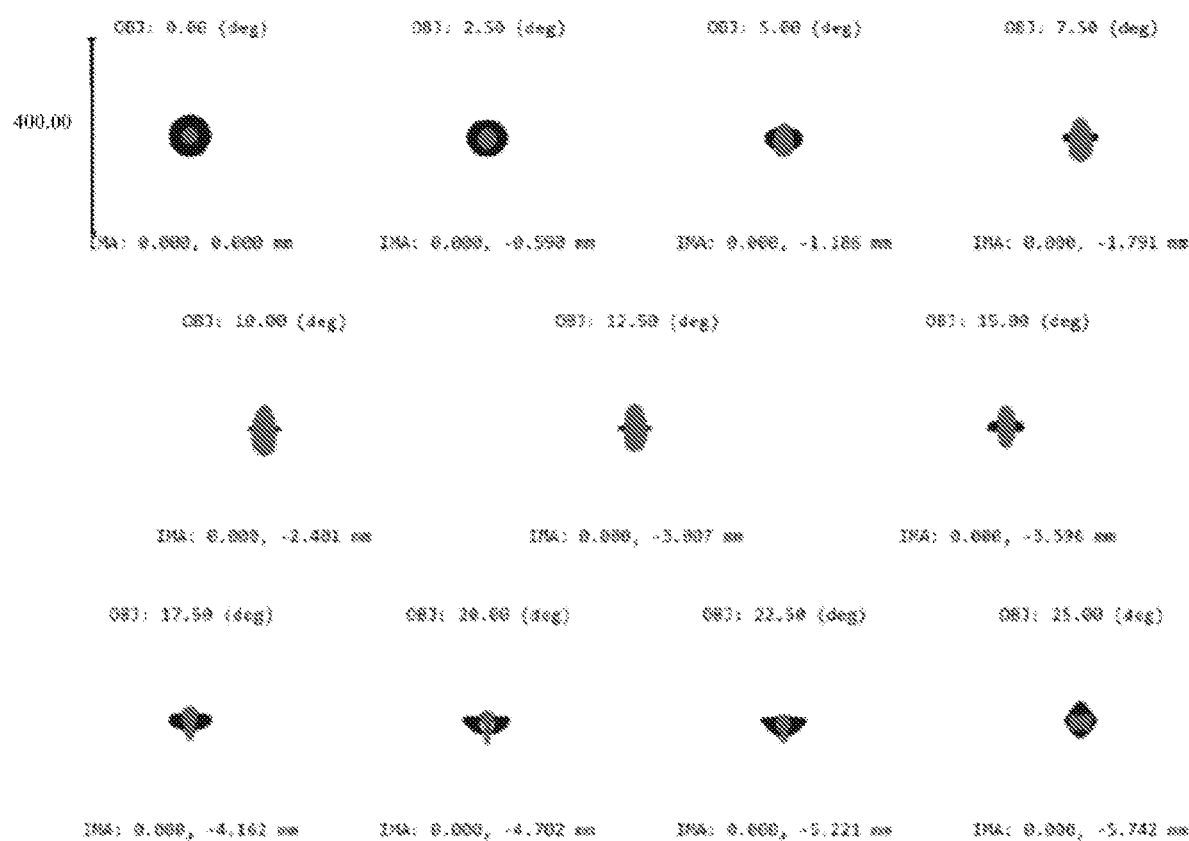
FIG. 18 is a schematic spot diagram of the reflective eyepiece optical system according to the fifth embodiment of the present invention.
Figure 19A:
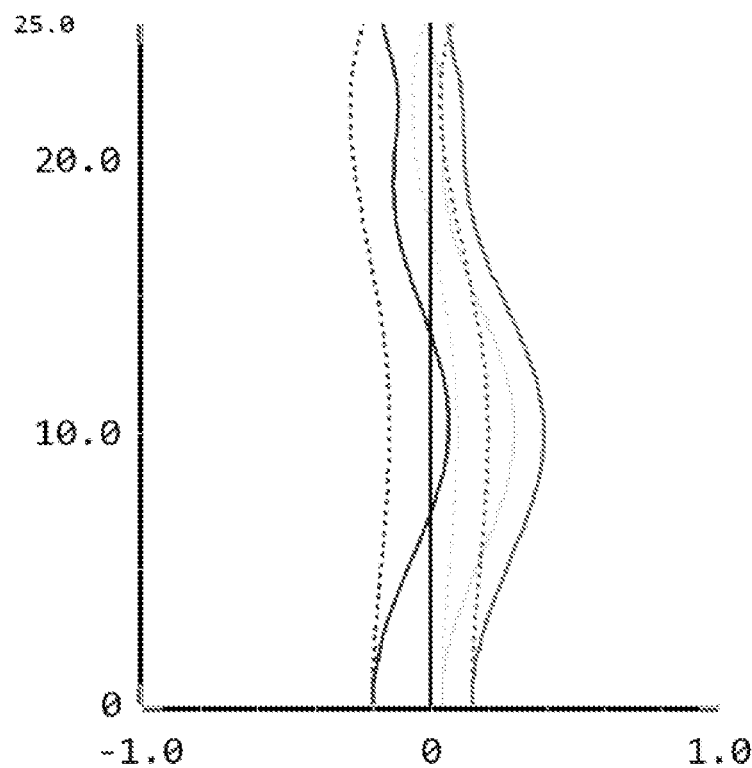
FIG. 19a is a schematic diagram of a field curvature of a reflective eyepiece optical system according to the fifth embodiment of the present invention.
Figure 19B:
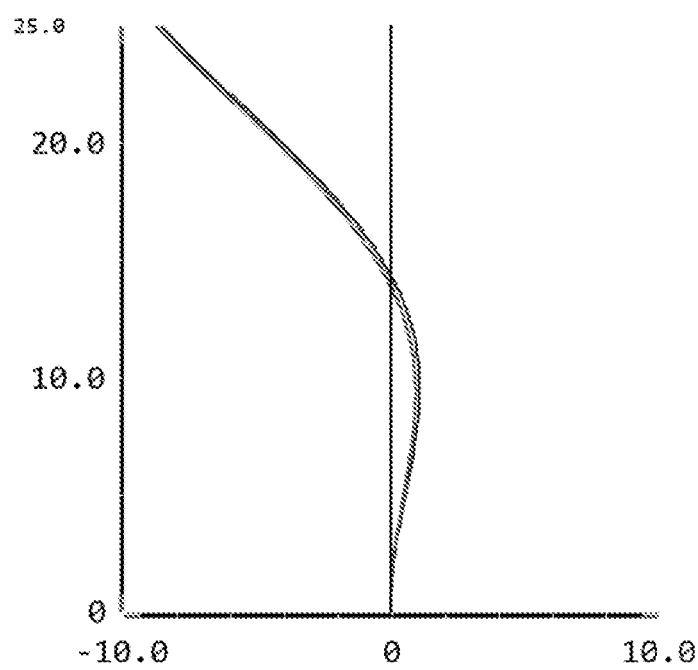
FIG. 19b is a schematic diagram of a distortion of the reflective eyepiece optical system according to the fifth embodiment of the present invention.
Figure 20:
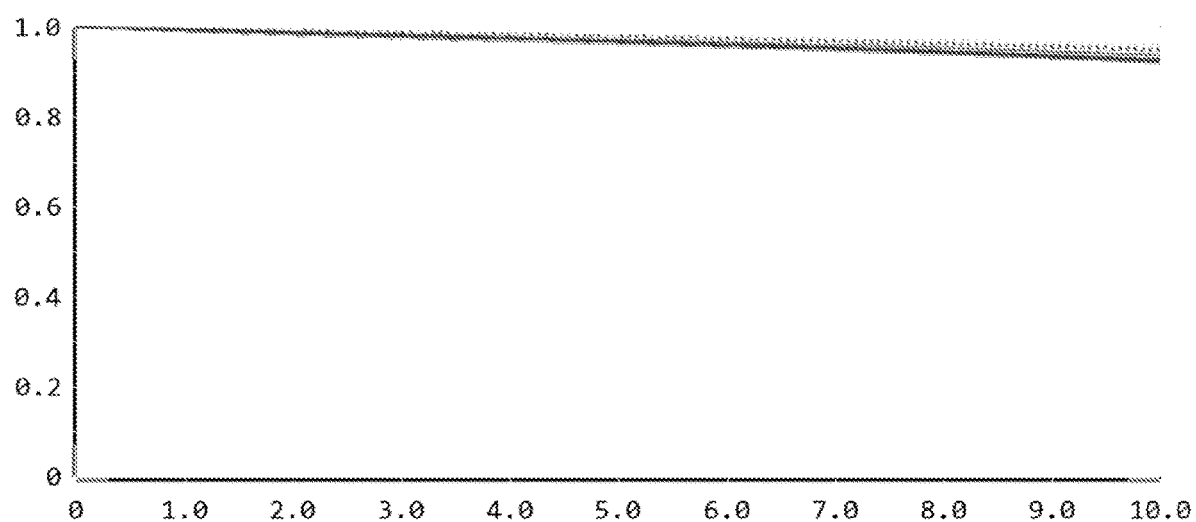
FIG. 20 is a schematic diagram of an optical MTF of the reflective eyepiece optical system according to the fifth embodiment of the present invention.

FIG. 17 is an optical path diagram of an optical system according to Example 5, including a first lens group T1, and a first optical element L1 and a second lens group T2 for transmitting and reflecting a light from a miniature image displayer (IMG). The second lens group T2 includes an optical reflection surface S2, and the optical reflection surface S2 is an optical surface farthest from a human eye viewing side in the second lens group T2. The optical reflection surface S2 is concave to the human eye viewing direction. The first optical element L1 reflects the light refracted by the first lens group T1 to the second lens group T2, and then transmits the light refracted, reflected, and refracted by the second lens group T2 to the human eyes EYE.

The first lens group T1 includes a first sub-lens group T11, a second sub-lens group T12, and a third sub-lens group T13. The first sub-lens group T11 is a positive lens group, the second sub-lens group T12 is a negative lens group, and the third sub-lens group T13 is a positive lens group. The first sub-lens group T11 is composed of a first lens T111 and a second lens T112, and the first lens T111 and the second lens T112 are both positive lenses. The second sub-lens group T12 is composed of a third lens T121, and the third lens T121 is a negative lens. The third sub-lens group T13 is composed of a fourth lens T131, and the fourth lens T131 is a positive lens. The second lens group T2 is composed of a fifth lens T21, where the optical reflection surface S2 is located on an optical surface of the fifth lens T21 distant from the human eye EYE viewing side. The optical reflection surface S2 is concave to the human eye viewing direction.

An effective focal length $f_w$ of the eyepiece optical system is −13.5, an effective focal length $f_1$ of the first lens group T1 is 10.89, an effective focal length $f_2$ of the second lens group T2 is 18.6, and an effective focal length $f_{S2}$ of the optical reflection surface S2 is 18.6. A distance $d_1$ along the optical axis between the first optical element L1 and the second lens group T2 is 12.8, and a distance $d_2$ along the optical axis between the first optical element L1 and the first lens group T1 is 20.57. An effective focal length $f_{11}$ of the first sub-lens group is 154.93, an effective focal length $f_{111}$ of the first lens T111 is 22.56, an effective focal length $f_{12}$ of the second sub-lens group T12 is −2555.29, and an effective focal length $f_{13}$ of the third sub-lens group is 14.8. Then, $f_1/f_w$ is −0.81, $f_2/f_w$ is −1.38, $f_{11}/f_1$ is 1.20, $f_{111}/f_{11}$ is 1.72, $f_{12}/f_1$ is −234.65, $f_{13}/f_1$ is 1.36, $f_{121}$ is −2555.29, $f_{S2}/f_2$ is 1, $d_2/d_1$ is 1.61, and $\lambda_1$ is 70°.

FIG. 18, FIG. 19a, FIG. 19b, and FIG. 20 are respectively the spot diagram, the field curvature diagram, the distortion diagram, and the transfer function MTF plot, reflecting that respective field-of-view light in this example has high resolution and small optical distortion in the unit pixel of the image plane (miniature image displayer (IMG)). The resolution per 10 mm per unit period reaches more than 0.9. The aberrations of the optical system and image drift are well corrected, and a display portrait of uniformity and high optical performance can be observed through the eyepiece optical system.

Example 6

The eyepiece design data of Example 6 is shown below in Table 6:

TABLE 6

| Surface | Lens | | | | | |
|---|---|---|---|---|---|---|
| | Curvature radius (mm) | Thickness (mm) | Refractive index | Abbe number | Net aperture (mm) | Cone coefficient |
| Diaphragm | Infinite | 47 | | | 5 | |
| 2 | −54.43931 | −24 | | reflection | 48.95158 | −14.05856 |
| 3 | Infinite | 32.3114 | | reflection | 59.65487 | |
| 4 | Infinite | −10 | | reflection | 13.32531 | |
| 5 | −16.44166 | −2.618275 | 1.53116 | 56.043828 | 7.833633 | −1.749706 |
| 6 | −32.72957 | −2.152342 | | | 7.364828 | −34.94002 |
| 7 | −16.67698 | −6.506248 | 1.651133 | 55.903805 | 8.317541 | −2.015585 |
| 8 | 15.67356 | −0.2656935 | | | 8.599111 | 0.8499103 |
| 9 | 20.37391 | −3.964838 | 1.64219 | 22.408848 | 8.492684 | −3.615109 |
| 10 | −29.40104 | −2.29513 | | | 9.577369 | −16.08668 |
| 11 | −142.7324 | −4.385973 | 1.72 | 50.351963 | 10.89104 | −4.662146 |
| 12 | 61.45032 | −6.68695 | | | 12.29765 | 9.621991 |

TABLE 6-continued

| Surface | Curvature radius (mm) | Thickness (mm) | Refractive index | Abbe number | Net aperture (mm) | Cone coefficient |
|---|---|---|---|---|---|---|
| 13 | −17.92474 | −5 | 1.80999 | 41.000073 | 16.57147 | −6.966687 |
| 14 | −19.54462 | −6.85811 | | | 15.97538 | −0.1664377 |
| Image plane | Infinite | | | | 17.60037 | |

Figure 21A:
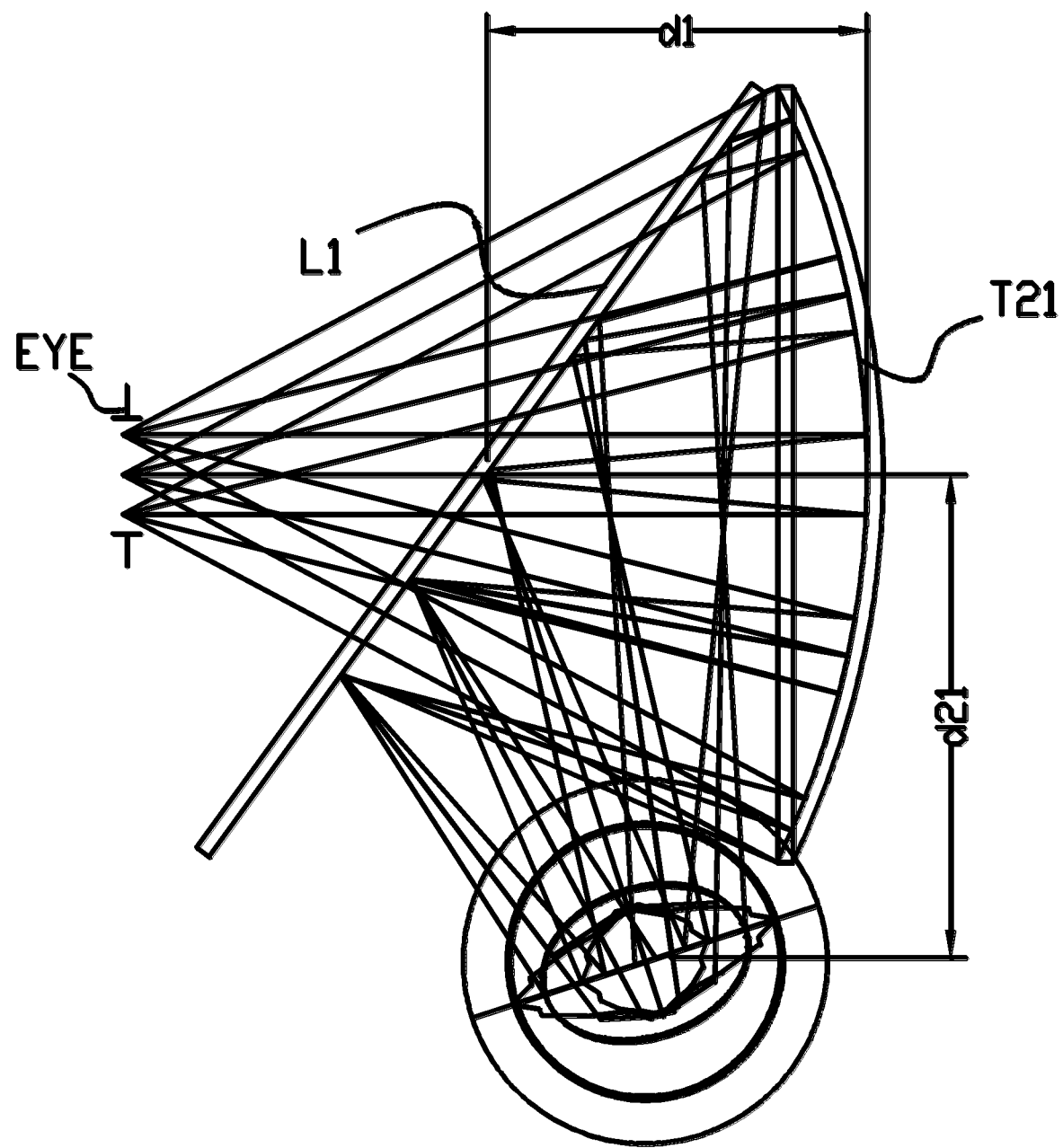
FIG. 21a is a front view of an optical path of a reflective eyepiece optical system according to a sixth embodiment of the present invention.
Figure 21B:
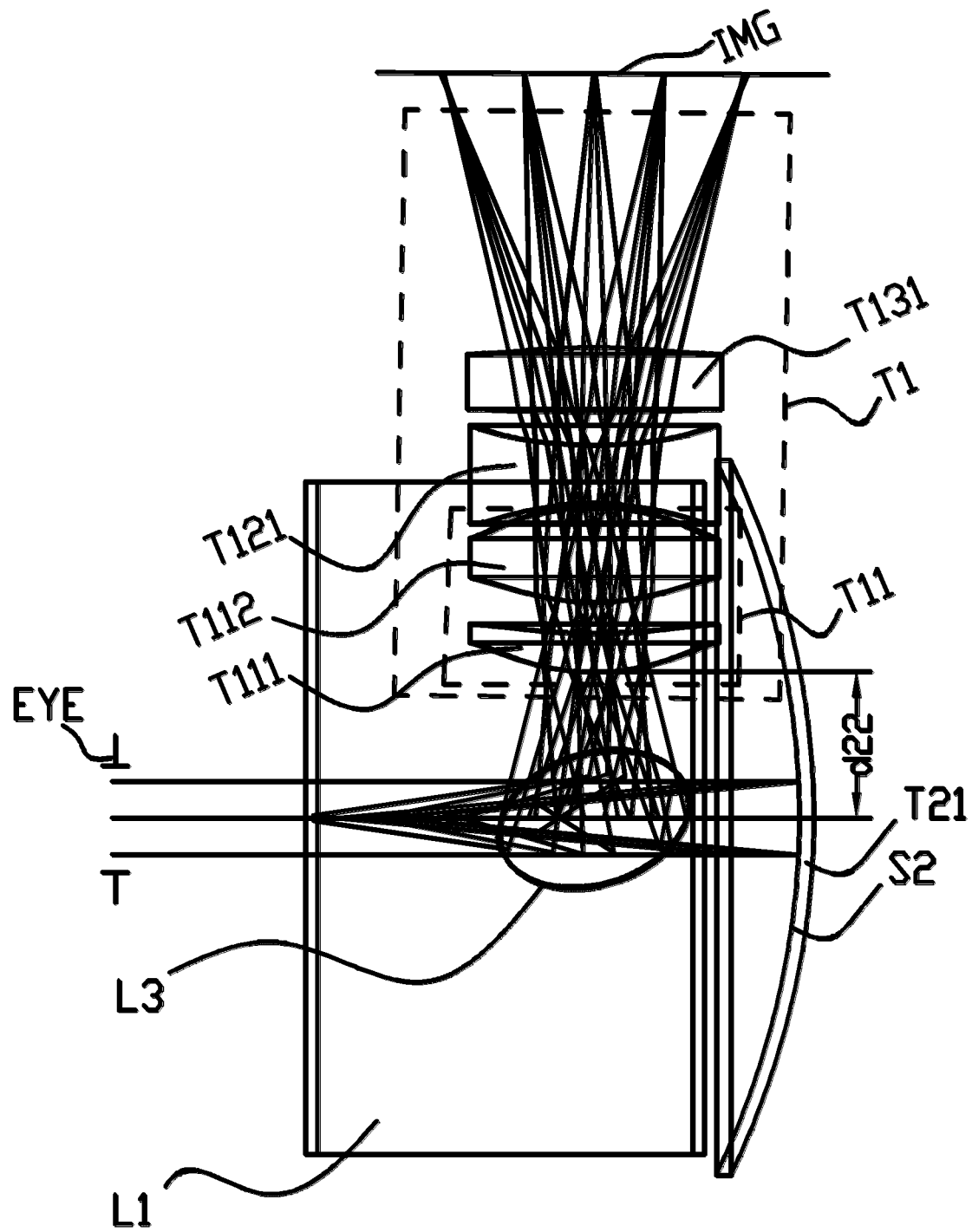
FIG. 21b is a top view of the optical path of the reflective eyepiece optical system according to the sixth embodiment of the present invention.
Figure 22:
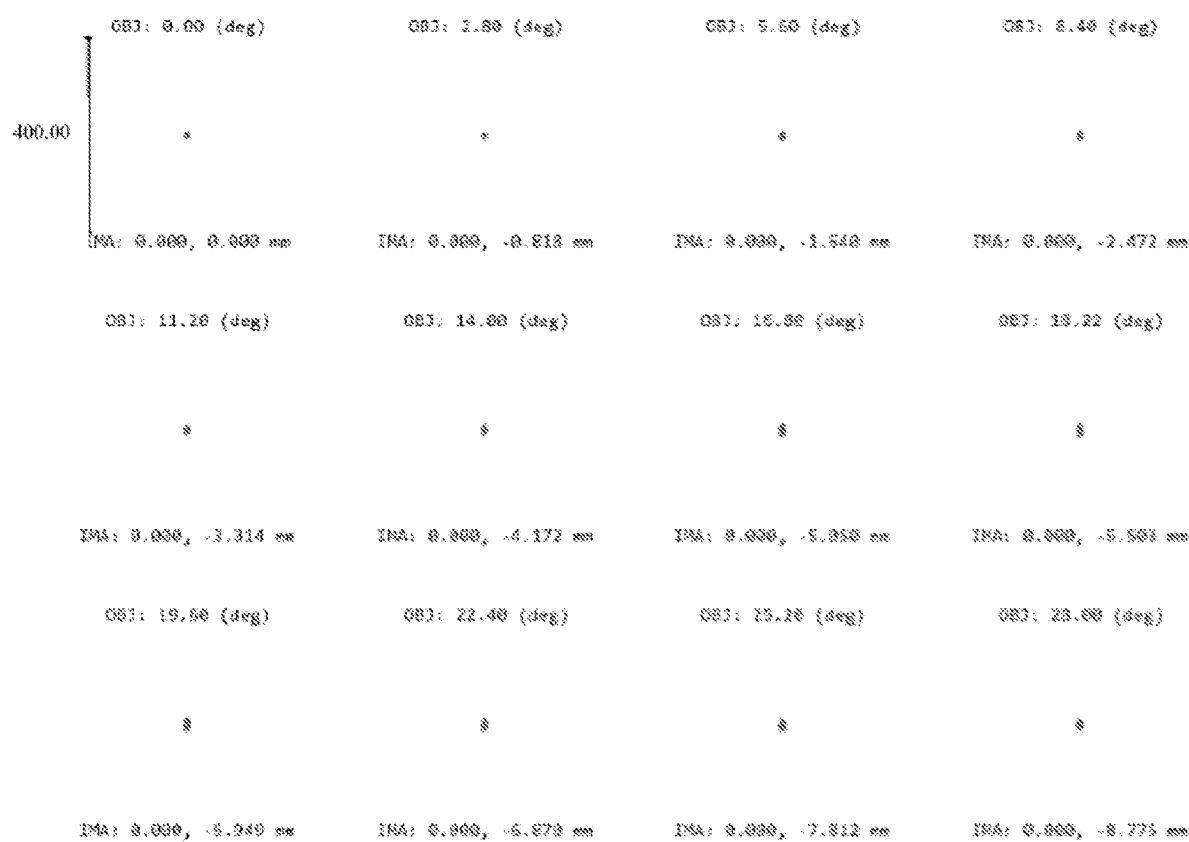
FIG. 22 is a schematic spot diagram of the reflective eyepiece optical system according to the sixth embodiment of the present invention.
Figure 23A:
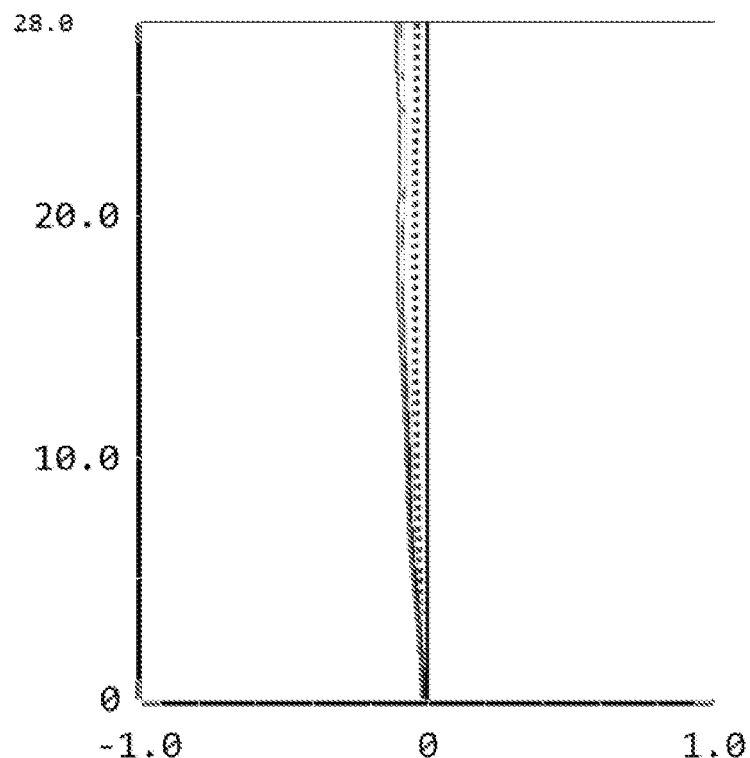
FIG. 23a is a schematic diagram of a field curvature of a reflective eyepiece optical system according to the sixth embodiment of the present invention.
Figure 23B:
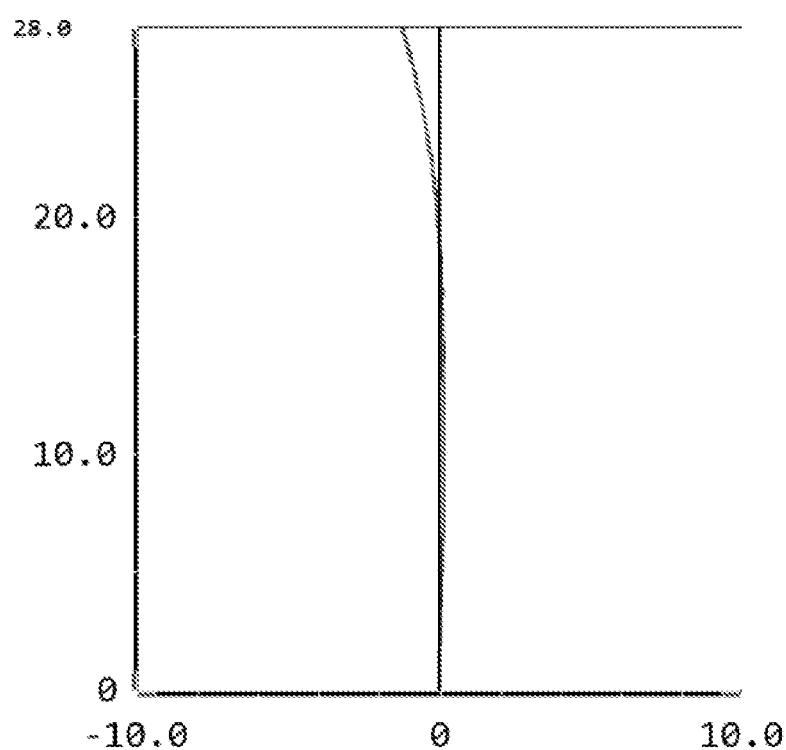
FIG. 23b is a schematic diagram of a distortion of the reflective eyepiece optical system according to the sixth embodiment of the present invention.
Figure 24:
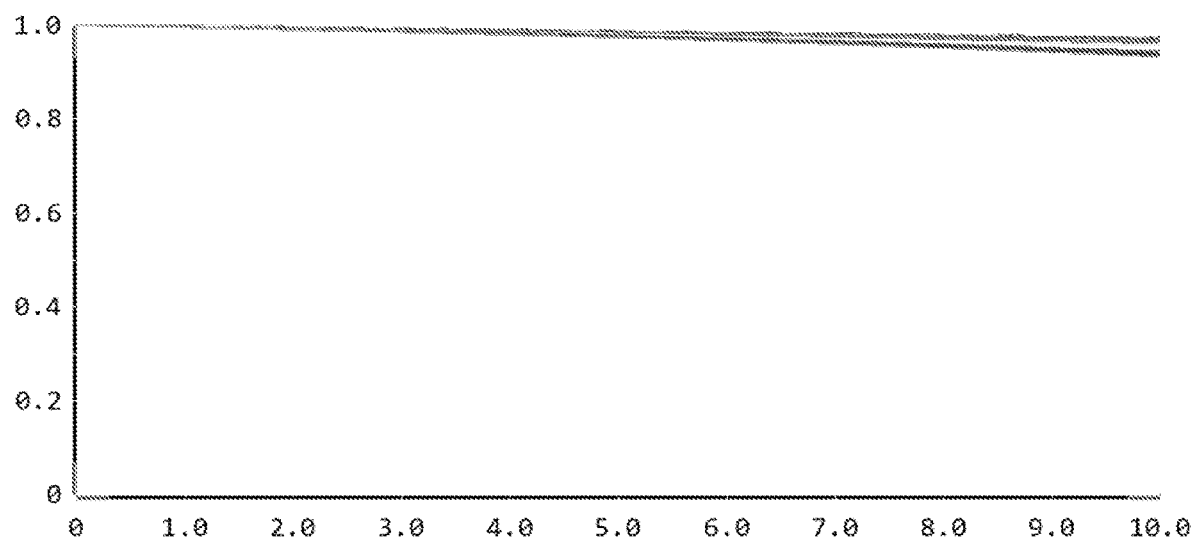
FIG. 24 is a plot of an optical MTF of the reflective eyepiece optical system according to the sixth embodiment of the present invention.

FIG. 21a and FIG. 21b are a front view and a top view of the optical path of the eyepiece optical system according to Example 4 including a first lens group T1, and a first optical element L1 and a second lens group T2 for transmitting and reflecting a light from a miniature image displayer IMG, and further includes a planar reflective optical element L3 located between the first lens group and the first optical element. The second lens group T2 includes an optical reflection surface S2, and the optical reflection surface S2 is an optical surface farthest from a human eye viewing side in the second lens group T2. The optical reflection surface S2 is concave to the human eye viewing direction. The planar reflective optical element L3 reflects the light refracted by the first lens group T1 to the first optical element L1, and the first optical element L1 reflects the light into the second lens group T2, and then transmits the light refracted, reflected, and refracted by the second lens group T2 to the human eyes EYE.

The first lens group T1 includes a first sub-lens group T11, a second sub-lens group T12, and a third sub-lens group T13. The first sub-lens group T11 is a positive lens group, the second sub-lens group T12 is a negative lens group, and the third sub-lens group T13 is a positive lens group. The first sub-lens group T11 is composed of a first lens T111 and a second lens T112, and the first lens T111 and the second lens T112 are both positive lenses. The second sub-lens group T12 is composed of a third lens T121, and the third lens T121 is a negative lens. The third sub-lens group T13 is composed of a fourth lens T131, and the fourth lens T131 is a positive lens. The second lens group T2 is composed of a fifth lens T21, where the optical reflection surface S2 is located on an optical surface of the fifth lens T21 distant from the human eye EYE viewing side. The optical reflection surface S2 is concave to the human eye viewing direction.

An effective focal length $f_w$ of the eyepiece optical system is −16.7, an effective focal length $f_1$ of the first lens group T1 is 16.76, and an effective focal length $f_2$ of the second lens group T2 is 27.22. A distance $d_1$ along the optical axis between the first optical element L1 and the second lens group T2 is 24, and a distance $d_2$ along the optical axis between the first optical element L1 and the first lens group T1 is 42.31, where $d_2$ consists of $d_{21}$ and $d_{22}$. An effective focal length $f_{11}$ of the first sub-lens group T11 is 12.26, an effective focal length $f_{111}$ of the first lens T111 is 58.91, an effective focal length $f_{12}$ of the second sub-lens group T12 is −18.17, and an effective focal length $f_{13}$ of the third sub-lens group T13 is 60.2. Then, $f_1/f_w$ is −1.0, $f_2/f_w$ is −1.63, $f_{11}/f_1$ is 0.73, $f_{111}/f_{11}$ is 4.81, $f_{12}/f_1$ is −1.08, $f_{13}/f_1$ is 3.59, an effective focal length $f_{121}$ of the third lens T121 is −18.17, $d_2/d_1$ is 1.76, $\lambda_1$ is 74°, and $\lambda_2$ is 90°.

FIG. 22, FIG. 23a, FIG. 23b, and FIG. 24 are respectively the spot diagram, the field curvature diagram, the distortion diagram, and the transfer function MTF plot, reflecting that respective field-of-view light in this example has high resolution and small optical distortion in the unit pixel of the image plane (miniature image displayer (IMG)). The resolution per 10 mm per unit period reaches more than 0.9. The aberrations of the optical system and image drift are well corrected, and a display portrait of uniformity and high optical performance can be observed through the eyepiece optical system.

The data of the above first to sixth examples all meet parameter requirements recorded in the Summary of the Invention, and results are shown in the following Table 7:

TABLE 7

| | $f_1/f_w$ | $f_2/f_w$ | $f_{11}/f_1$ | $f_{111}/f_{11}$ | $f_{12}/f_1$ | $f_{13}/f_1$ |
|---|---|---|---|---|---|---|
| Example 1 | −0.48 | −0.65 | 0.74 | 1 | −3.37 | 1.82 |
| Example 2 | −0.97 | −1.50 | 0.78 | 1 | −1.91 | 1.38 |
| Example 3 | −1.02 | −1.76 | 0.82 | 1 | −2.5 | 1.33 |
| Example 4 | −100.37 | −2.52 | 0.20 | 0.11 | −0.02 | 0.02 |
| Example 5 | −0.81 | −1.38 | 1.20 | 1.72 | −234.65 | 1.36 |
| Example 6 | −1.0 | −1.63 | 0.73 | 4.81 | −1.08 | 3.59 |

The present application provides a head-mounted near-to-eye display device, including a miniature image displayer, and further including the reflective eyepiece optical system according to any one of above items, where the eyepiece optical system is located between the human eyes and the miniature image displayer.

Preferably, the miniature image displayer is an organic electroluminescence device.

Preferably, the head-mounted near-to-eye display device includes two identical reflective eyepiece optical systems.

To sum up, the first lens group of the reflective eyepiece optical system in the above examples of the present invention includes three sub-lens groups, which are the first sub-lens group, the second sub-lens group, and the third sub-lens group, respectively. The effective focal lengths of the first sub-lens group, the second sub-lens group, and the third sub-lens group adopt a combination of positive, negative, and positive, which fully corrects aberrations of the system and improves the optical resolution of the system. More importantly, with the transmission and reflection properties of the first optical element and the second lens group, the second lens group has an optical reflection surface, which effectively folds the optical path, reduces the overall size of the eyepiece optical system, and improves the possibility of subsequent mass production. On the basis of miniaturization, cost and weight reduction for the article, the aberrations of the optical system are greatly eliminated, and the basic optical indicators are also improved, ensuring high image quality and increasing the size of the picture angle. Therefore, an observer can watch large images of full frame, high definition and uniform image quality without any distortion and get visual experience of high liveness via the present invention, which is suitable for head-mounted near-to-eye display devices and similar devices thereof.

It should be understood that, for one of ordinary skill in the art, the foregoing description can be modified or altered, and all such modifications and alterations fall into the scope of the attached claims of the present invention.

What is claimed is:

1. A reflective eyepiece optical system, composed of a first lens group, and a first optical element and a second lens group for transmitting and reflecting a light from a miniature image displayer; wherein the second lens group comprises an optical reflection surface, and the optical reflection surface is an optical surface farthest from a human eye viewing side in the second lens group; the optical reflection surface is concave to the human eyes; the first optical element reflects the light refracted by the first lens group to the second lens group, and then transmits the light refracted, reflected, and refracted by the second lens group to the human eyes;

an effective focal length of the eyepiece optical system is $f_w$, an effective focal length of the first lens group is $f_1$, an effective focal length of the second lens group is $f_2$, and $f_w$, $f_1$, $f_2$ satisfy the following relations (1) and (2):

$$f_1/f_w < -0.47 \quad (1);$$

$$-2.53 < f_2/f_w < -0.64 \quad (2);$$

the first lens group comprises a first sub-lens group, a second sub-lens group, and a third sub-lens group arranged coaxially and successively along an optical axis from the human eye viewing side to the miniature image displayer side; effective focal lengths of the first sub-lens group, the second sub-lens group, and the third sub-lens group are a combination of positive, negative, and positive; the effective focal length of the first sub-lens group is $f_{11}$, the effective focal length of the second sub-lens group is $f_{12}$, the effective focal length of the third sub-lens group is $f_{13}$, and $f_{11}$, $f_{12}$, $f_{13}$, and $f_1$ satisfy the following relations (3), (4), and (5):

$$0.19 < f_{11}/f_1 \quad (3);$$

$$f_{12}/f_1 < -0.019 \quad (4);$$

$$0.019 < f_{13}/f_1 \quad (5).$$

2. The reflective eyepiece optical system according to claim 1, wherein a distance along the optical axis between an optical surface of the first optical element distant from the human eye viewing side and the optical reflection surface of the second lens group is $d_1$, a distance along the optical axis between the optical surface of the first optical element distant from the human eye viewing side and an optical surface in the first lens group closest to the human eye viewing side is $d_2$, and $d_1$ and $d_2$ satisfy the following relation (6):

$$0.69 < d_2/d_1 \quad (6).$$

3. The reflective eyepiece optical system according to claim 1, wherein a maximum effective optical aperture of the second lens group is $\varphi_2$, and $\varphi_2$ satisfies the following relation (7):

$$\varphi_2 < 70 \text{ mm} \quad (7).$$

4. The reflective eyepiece optical system according to claim 1, wherein the first sub-lens group is composed of one lens, the first sub-lens group comprises a first lens, and the first lens is a positive lens.

5. The reflective eyepiece optical system according to claim 1, wherein the first sub-lens group is composed of two lenses; the first sub-lens group comprises a first lens and a second lens arranged coaxially and successively along the optical axis from the human eye viewing side to the miniature image displayer side; and the first lens and the second lens are both positive lenses.

6. The reflective eyepiece optical system according to claim 4, wherein an effective focal length of the first lens is $f_{111}$, the effective focal length of the first sub-lens group is $f_{11}$, and $f_{111}$ and $f_{11}$ satisfy the following relation (8):

$$0.10 < |f_{111}/f_{11}| \quad (8).$$

7. The reflective eyepiece optical system according to claim 4, wherein an optical surface of the first lens proximate to the human eye viewing side is convex to the human eyes.

8. The reflective eyepiece optical system according to claim 1, wherein the second sub-lens group is composed of a third lens adjacent to the first sub-lens group; the third lens is a negative lens; an optical surface of the third lens proximate to the miniature image displayer side is concave to the miniature image displayer; and an effective focal length of the third lens is $f_{121}$, and $f_{121}$ satisfies the following relation (9):

$$f_{121} < -5.38 \quad (9).$$

9. The reflective eyepiece optical system according to claim 1, wherein the third sub-lens group is composed of a fourth lens adjacent to the second sub-lens group; the fourth lens is a positive lens; and an effective focal length of the fourth lens is $f_{131}$, and $f_{131}$ satisfies the following relation (10):

$$8.82 < f_{131} \quad (10).$$

10. The reflective eyepiece optical system according to claim 1, wherein the effective focal length $f_{11}$ of the first sub-lens group, the effective focal length $f_{12}$ of the second sub-lens group, the effective focal length $f_{13}$ of the third sub-lens group, and the effective focal length $f_1$ of the first lens group further satisfy the following relations (11), (12), and (13):

$$0.73 < f_{11}/f_1 < 0.83 \quad (11);$$

$$-3.38 < f_{12}/f_1 < -1.90 \quad (12);$$

$$1.32 < f_{13}/f_1 < 1.83 \quad (13).$$

11. The reflective eyepiece optical system according to claim 1, wherein the second lens group is composed of a fifth lens adjacent to the first optical element; and the optical reflection surface is located on an optical surface of the fifth lens distant from the human eyes.

12. The reflective eyepiece optical system according to claim 1, wherein the second lens group is composed of a fifth lens and a sixth lens adjacent to the first optical element; the fifth lens and the sixth lens are arranged successively in an incident direction of an optical axis of the human eyes; and the optical reflection surface is located on an optical surface of the fifth lens distant from the human eyes.

13. The reflective eyepiece optical system according to claim 1, wherein an effective focal length of the optical reflection surface is $f_{S2}$, the effective focal length of the second lens group is $f_2$, and $f_2$ and $f_{S2}$ satisfy the following relation (14):

$$0.46 \leq f_{S2}/f_2 \leq 1.0 \quad (14).$$

14. The reflective eyepiece optical system according to claim 1, wherein the first optical element is a planar transflective optical element, a reflectivity of the first optical element is $Re_1$, and $Re_1$ satisfies the following relation (15):

$$20\% < Re_1 < 80\% \tag{15}$$

15. The reflective eyepiece optical system according to claim 1, wherein a reflectivity of the optical reflection surface is $Re_2$, and $Re_2$ satisfies the following relation (16):

$$20\% < Re_2 \tag{16}$$

16. The reflective eyepiece optical system according to claim 1, wherein an angle of optical axis between the first lens group and the second lens group is $\lambda_1$, and $\lambda_1$ satisfies the following relation (17):

$$55° < \lambda_1 < 120° \tag{17}$$

17. The reflective eyepiece optical system according to claim 1, wherein the eyepiece optical system further comprises a planar reflective optical element located between the first lens group and the first optical element; the planar reflective optical element reflects the light refracted by the first lens group to the first optical element, the first optical element reflects the light to the second lens group, and then transmits the light refracted, reflected, and refracted by the second lens group to the human eyes;

an angle of optical axis between the first lens group and the first optical element is $\lambda_2$, and $\lambda_2$ satisfies the following relation (18):

$$60° \leq \lambda_2 \leq 180° \tag{18}$$

18. The reflective eyepiece optical system according to claim 1, wherein the first lens group comprises one or more even-order aspherical face shapes; and the optical reflection surface is an even-order aspherical face shape.

19. The reflective eyepiece optical system according to claim 1, wherein the material of various lenses in the second lens group is an optical plastic material.

20. A head-mounted near-to-eye display device, comprising a miniature image displayer, and further comprising the reflective eyepiece optical system according to claim 1, wherein the eyepiece optical system is located between the human eyes and the miniature image displayer.

\* \* \* \* \*